US006745178B1

(12) United States Patent
Emens et al.

(10) Patent No.: US 6,745,178 B1
(45) Date of Patent: Jun. 1, 2004

(54) INTERNET BASED METHOD FOR FACILITATING NETWORKING AMONG PERSONS WITH SIMILAR INTERESTS AND FOR FACILITATING COLLABORATIVE SEARCHING FOR INFORMATION

(75) Inventors: Michael L. Emens, San Jose, CA (US); Reiner Kraft, Gilroy, CA (US); Shang-Hua Teng, Sunnyvale, CA (US); Gaurav Tewari, Cambridge, MA (US); Peter Chi-Sing Yim, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/561,227

(22) Filed: Apr. 28, 2000

(51) Int. Cl.[7] ............................................. G06F 17/30
(52) U.S. Cl. ................... 707/3; 707/6; 707/7
(58) Field of Search ........................ 707/1–10

(56) References Cited

U.S. PATENT DOCUMENTS

| | | | | |
|---|---|---|---|---|
| 5,590,319 A | * | 12/1996 | Cohen et al. ................... | 707/4 |
| 5,647,058 A | * | 7/1997 | Agrawal et al. ................ | 707/1 |
| 5,696,962 A | * | 12/1997 | Kupiec ........................... | 707/4 |
| 5,696,964 A | * | 12/1997 | Cox et al. ...................... | 707/5 |
| 5,806,061 A | * | 9/1998 | Chaudhuri et al. ............. | 707/3 |
| 5,864,871 A | * | 1/1999 | Kitain et al. ................ | 707/104 |
| 5,873,076 A | * | 2/1999 | Barr et al. ...................... | 707/3 |
| 5,881,131 A | * | 3/1999 | Farris et al. ................... | 379/27 |
| 5,940,821 A | * | 8/1999 | Wical .............................. | 707/3 |
| 6,026,409 A | * | 2/2000 | Blumenthal ................. | 707/104 |
| 6,029,195 A | * | 2/2000 | Herz ........................... | 707/10 |
| 6,098,064 A | * | 8/2000 | Pirolli et al. ..................... | 707/2 |
| 6,112,202 A | * | 8/2000 | Kleinberg ....................... | 707/5 |
| 6,141,653 A | * | 10/2000 | Conklin et al. ................ | 705/80 |
| 6,175,829 B1 | * | 1/2001 | Li et al. ......................... | 707/3 |
| 6,324,534 B1 | * | 11/2001 | Neal et al. ...................... | 707/3 |
| 6,425,012 B1 | * | 7/2002 | Trovato et al. ............. | 709/227 |
| 6,434,546 B1 | * | 8/2002 | Williamowski et al. ....... | 707/3 |
| 6,434,548 B1 | * | 8/2002 | Emens et al. ................... | 707/3 |
| 6,434,549 B1 | * | 8/2002 | Linetsky et al. ................ | 707/3 |
| 6,493,703 B1 | * | 12/2002 | Knight et al. .................. | 707/3 |
| 6,618,727 B1 | * | 9/2003 | Wheeler et al. .............. | 707/10 |
| 2003/0061215 A1 | * | 3/2003 | Messina ........................ | 707/9 |

OTHER PUBLICATIONS

"Information Quality of Commercial web Site Home Pages: An Explorative Analysis" —Xiaoni Zhang, Kellie B. Keeling and Robert J. Pavur–ACM–Information systems Dec. 2000, (pps: 164–175).*

"Yahoo! as an Ontology: Using Yahoo! Categories to Describe Documents"–Yannis Larou & Tim Finin—ACM–Nov. 1999, (pps: 180–187).*

"CiteSeer: An Autonomous Web Agent for Automatic retrieval and Identification of Interesting Publications"—Kurt D. Bollacker, Steve Lawrence & C. Lee Giles–ACM–May 1999, (pps: 116–123).*

"Interactivity: The Web's New Standard"—Joe Dysart–ACM–Mixed Media Dec.1998, (pps: 30–36).* http://www.peoplelink.com.

* cited by examiner

Primary Examiner—Kim Vu
Assistant Examiner—Anh Ly
(74) Attorney, Agent, or Firm—Jon A. Gibbons; Fleit, Kain, Gibbons, Gutman, Bongini & Bianco P.L.

(57) ABSTRACT

A method in a computer network for identifying users with similar interests is described. The method includes accepting a first query statement from a first user and storing a first item of information related to the first query. The method further includes accepting a second query from a second user and storing a second item of information related to the second query. The method further includes computing a measure of similarity of the first query and the second query by using the first item of information and the second item of information. A system and computer readable medium for carrying out the above method is also described.

17 Claims, 22 Drawing Sheets

INTERNET BASED METHOD FOR FACILITATING NETWORKING AMONG PERSONS WITH SIMILAR INTERESTS AND FOR FACILITATING COLLABORATIVE SEARCHING FOR INFORMATION

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

FIELD OF THE INVENTION

This invention pertains to information retrieval technologies, Internet search techniques, and communications. More particularly the invention pertains to a system and method that automatically introduces persons with similar interests to each other and allows multiple parties to collaborate in endeavoring to locate particular information within a vast information archive.

BACKGROUND OF THE INVENTION

The exponential growth of the Internet over the past decade has created an immense repository of information, containing a quantity and variety of accessible information undreamed of in the past. The main, top level, format used to present documents on the Internet is the Hypertext Markup language (HTML), however the Internet includes a wide variety of information presented in a variety of formats, for example plain text files (e.g., descriptions, source code), narrative audio files, and video files.

Several years ago search engines were developed to help users find information on the Internet. A difficulty in finding information on the Internet, which distinguishes it from a centrally designed, and managed data base, e.g., a commercial technical literature databases, arises from the variety of ways in which information is organized and presented on the Internet. HTML and other formats used on the Internet provide wide flexibility in the way information is presented. At the host level, the arrangement of Internet sites is also not standardized. More importantly, there are no overarching editorial guidelines which dictate how information is to be presented on the Internet. The lack of restrictions certainly promotes the free publication of information, but on the other hand, it hinders organization and finding of information. Some search engines access databases of information compiled by web robot programs which continually visit new web sites and gather information on them. The variety of rules used by the web robots in collecting the information, in combination with the lack of standardization of information on the Internet, contribute to Internet search engine performance which is not on par with commercial data bases, e.g., technical literature databases. Commercial data bases often benefit from the contribution of human intelligence, in the form of abstractors who prepare abstracts and compile lists of keywords after reading the documents.

The Internet has the potential, which to some extent has been realized, of facilitating networking (in a social sense) of sparsely geographically distributed people who share common interests, (e.g., some narrow scientific or cultural interest). Social networking includes a first phase of introduction, and a second phase of communication on common interest, e.g., discussion of mutually beneficial actions. Existing Internet functionality such as Usenet news groups and inter relay chat (chat rooms) provide a forum for discussion. Geocities, an Internet Service Provider matches up users in virtual communities based on their answers to a questionnaire The Internet does not provide a means for automatically introducing people with similar interests.

Accordingly what is needed is a system and method which overcomes the above mentioned shortcomings. What is needed is a computer network based system which automatically matches up persons with similar interests.

What is further needed is a system that allows a person to obtain the benefit of other human intelligence in searching for information using a database, e.g., a network-based database.

SUMMARY OF THE INVENTION

Briefly, in accordance with invention, a method in a computer network for identifying users with similar interests. The method comprising steps of: accepting a first query statement from a first user, storing a first item of information related to the first query, accepting a second query from a second user, storing a second item of information related to the second query, and computing a measure of similarity of the first query and the second query by using the first item of information and the second item of information.

According to another aspect of the invention a system and computer readable medium is disclosed for carrying out the above method.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Exemplary Network

Figure 1:
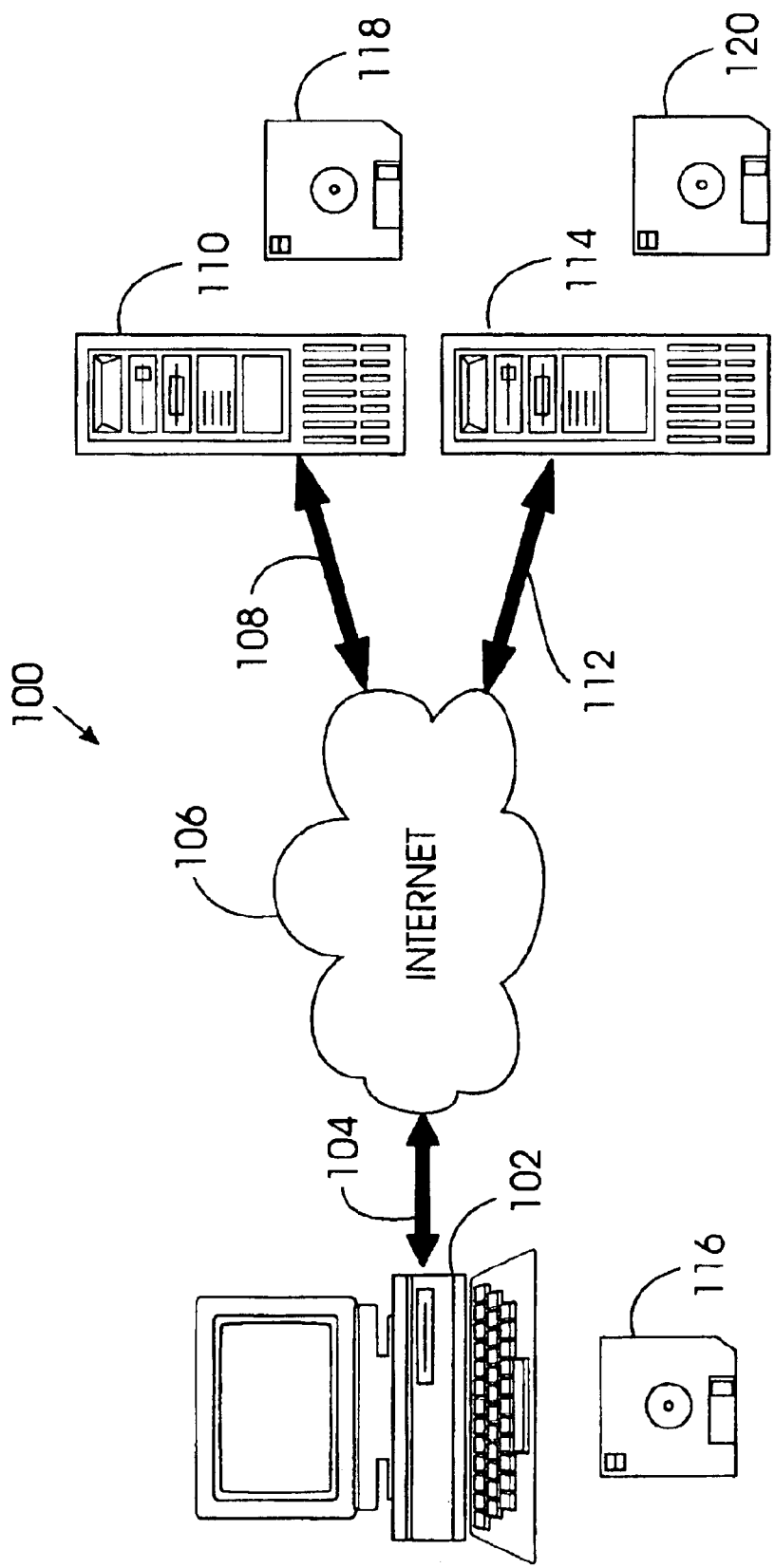
FIG. 1 is a schematic of a computer system used in practicing an embodiment of the invention.

Referring to FIG. 1 a schematic of a computer system 100 used in connection with an embodiment of the present invention is depicted. A client computer 102, is connected to the Internet designated by reference numeral 106, through a bidirectional data link 104. A memory disk 116 is provided for loading client side software into the client computer 102. An Internet search engine (index server) 110, is connected to the Internet 106 through a second bidirectional data link 108. One or more memory disks 118 are provided for loading software onto the index server 110, in order to configure the index server to perform its functions, described below. A collaborative search server, 114 is connected to the Internet via a third bidirectional data link 112. A memory disk 120 is provided for configuring the collaborative server to perform its functions, described below.

The client 102, is merely representative, of a plurality of client computers that are connected to the Internet and could be used in practicing the present invention.

The bidirectional data link 104 between the client computer and the Internet could for example take the form of a modem connection through a plain old telephone system (POTS) connection, a digital subscriber line (DSL) connection, or cable modem connection. The bidirectional data link could comprise an ethernet connection to a proxy server, and a T1 connection between the proxy server and an Internet Gateway. The bidirectional data links 108, 112 between the Internet and the servers 110, and 114 could for example comprise T5 lines which offer high bandwidth access to the Internet from the servers.

Exemplary Functional Block Diagram of Various Software Components

Figure 2:
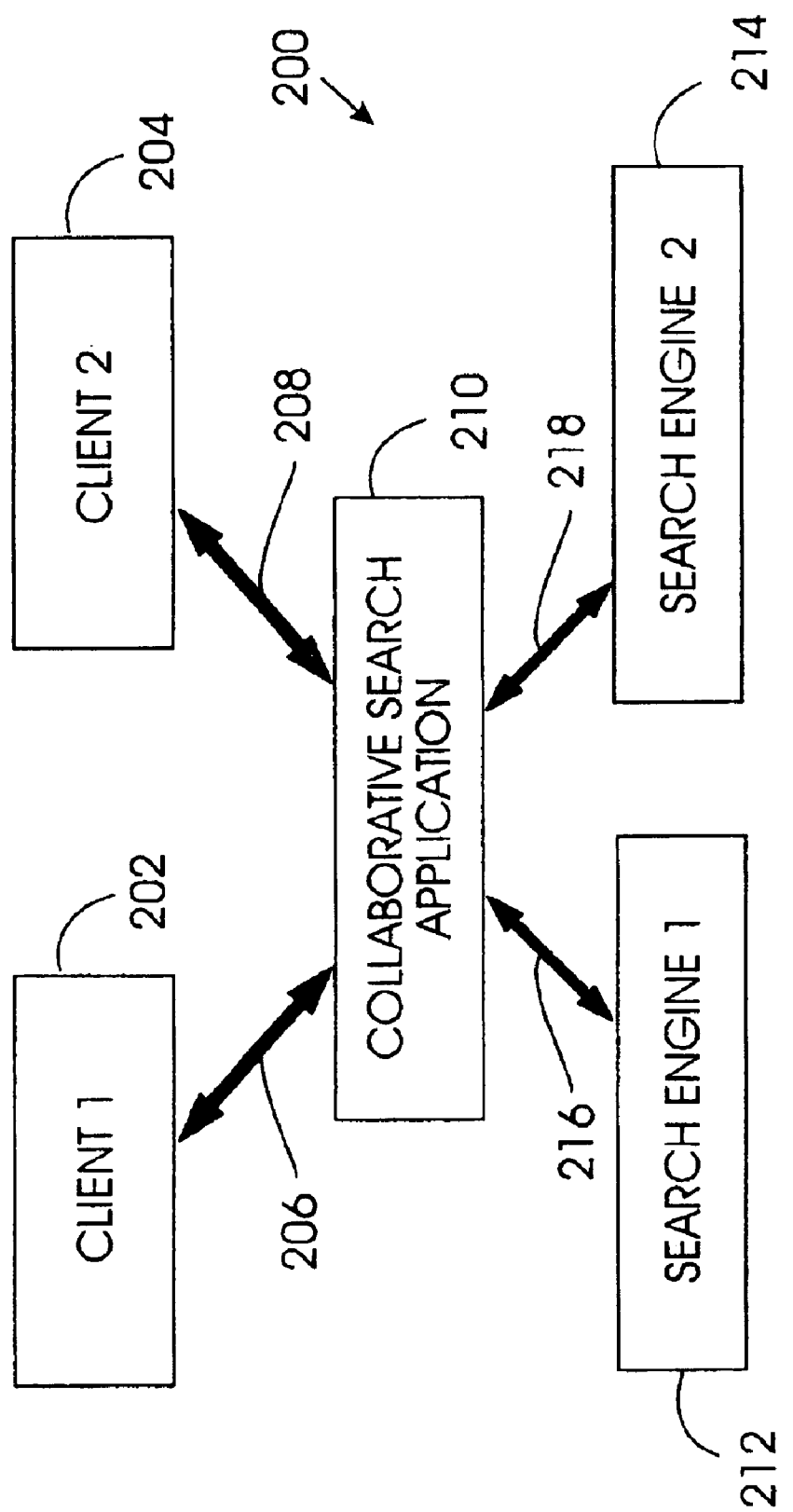
FIG. 2 is a representation of software interrelationship according to an embodiment of the present invention.

Referring to FIG. 2 a schematic representing the interrelationship of software components according to a preferred embodiment of the invention is shown.

A first client application 202 and a second client application 204 are in communication with a collaborative search application 210 through a first instance of a communication protocol 206, and second instance of a communication protocol 208 respectively. The first and second client applications 202, and 204 are merely representative, as any number of client applications could be in communication with the collaborative search application. In fact the invention is meant to provide a method and means for networking a large number of users using a large number of client computers. Among a very large seemingly intractable number of users the instant invention will serve to identify sets of users having common interests and to allow smaller subsets of users to collaborate in searching for information. The clients 202, and 204 could take the form of a web browser, whereas the collaborative search application could take the form of a Common Gateway Interface (CGI) program.

A first search engine (database index server) 212 and second search engine 214 are in communication with the collaborative search application through a third instance of a communication protocol 216 and a forth instance of a communication protocol 218.

It is noted that first, second third and fourth instances communication protocol instances 206,208,212,214 preferably comprise Hypertext Transfer Protocol (HTTP) over Transfer control protocol/Internet protocol (TCP/IP) However, any of the communication protocol instances could employ other communication protocols.

The collaborative search applications, in addition to other functions to be described below, can serve as a "meta search" interface to other search engines. In this capacity it receives a search request from a client, translates the search request into a number of formats required by a plurality of search engines forwards reformatted versions of the query to the plurality of search engines, receives answer sets back from the search engines, and forwards the answer sets to the querying client.

In FIG. 2 the two clients shown 202, and 204 are representative of a plurality of clients.

As will be described in more detail below, the collaborative search application functions to identify multiple users that share a common interest by analyzing the queries they send to one or more search engines.

Figure 3:
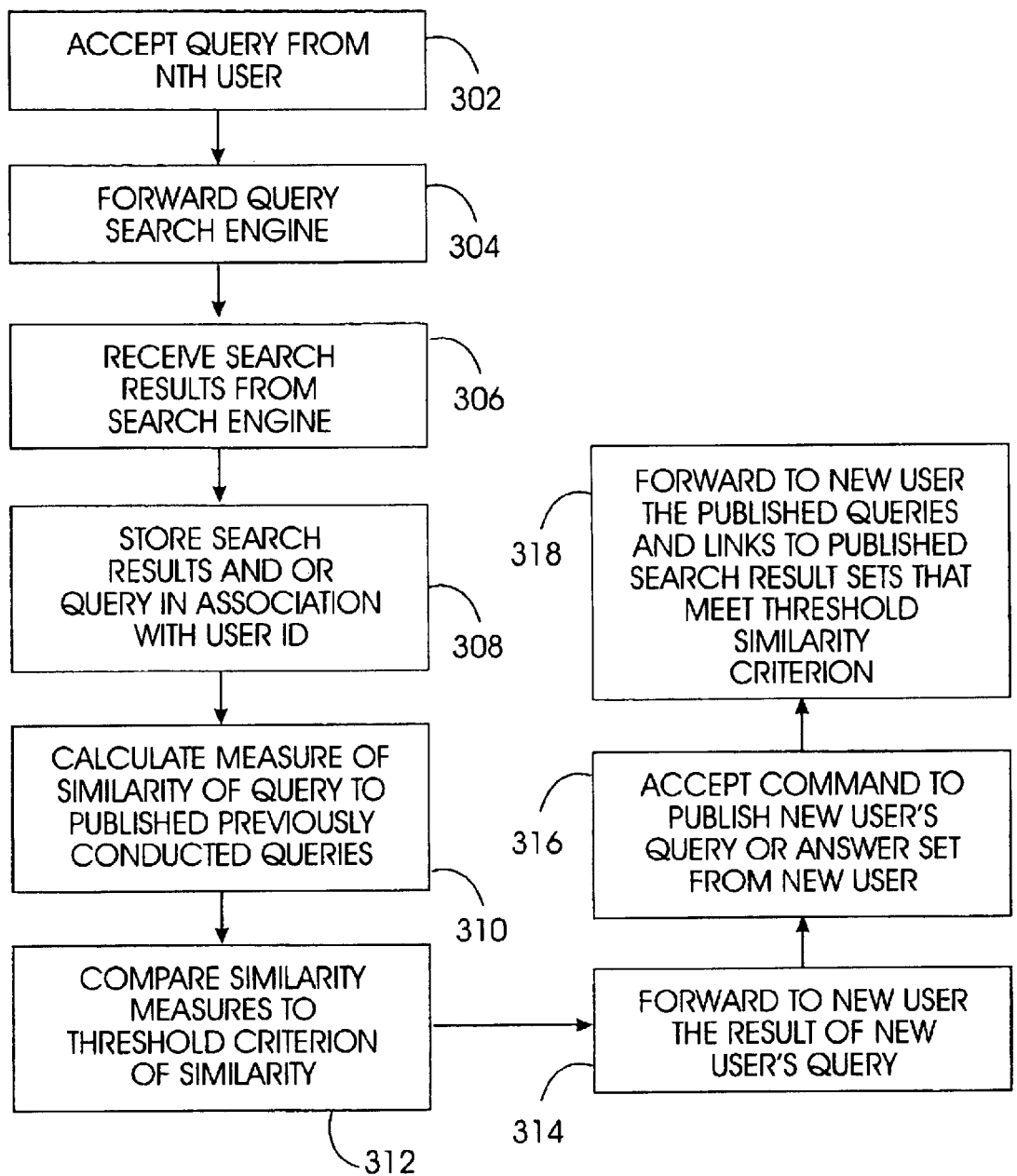
FIG. 3 is a flow diagram of a system for collaboration between users sharing common interests.
Figure 4A:
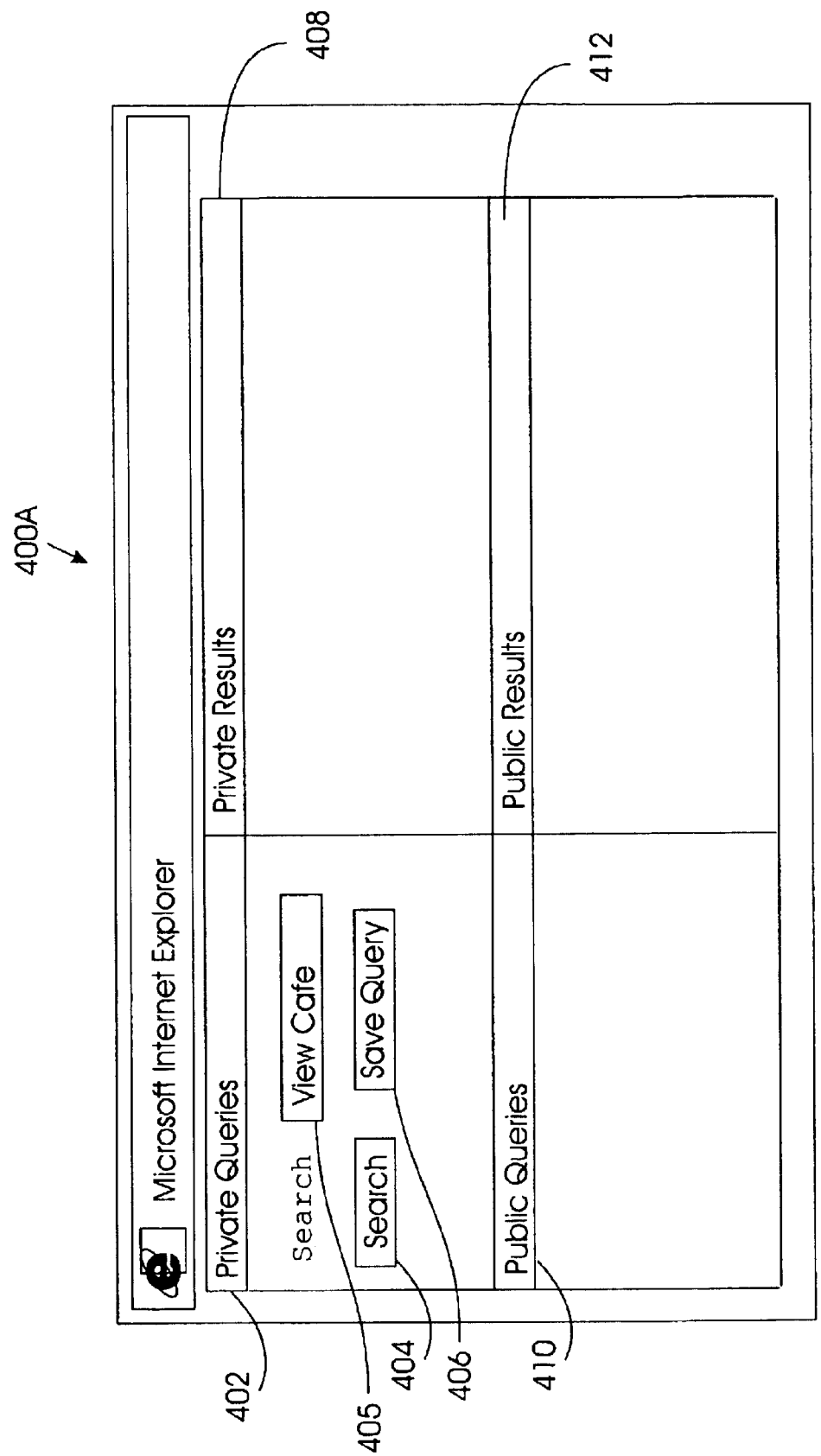
FIG. 4A is a depiction of a GUI used in connection with the flow diagram shown in FIG. 3.

Exemplary Method For Determining a Set of Users Having Shared Interests and Allowing Those Users to Share Answer Sets and Queries Referring to FIG. 3 a flow diagram of a method for allowing multiple users to collaborate in searching for information, according to an embodiment of the invention is shown. In first process block 302 a query is accepted from a user (call that user the Nth user), for example by the collaborative search application 210 running on the collaborative search server 114. The client process 202 may comprise a web browser which presents the user with an HTML format graphical user interface (GUI) 400A such as depicted in FIG. 4A for accepting user queries. As seen in FIG. 4A the GUI 400A comprises a web page divided into four quadrants. An upper left quadrant 402 comprises a text box 405 for entering a query, a search submit button 404, and a save query button 406. As seen in FIG. 4A, the text box 405 contains the query "view cafe". The upper right 408 quadrant is used for displaying a list of hyperlink results of the submitted query. The lower left quadrant 410 is used to display public queries which will be discussed below. The lower right quadrant 412 is used to display a list of public results which will be discussed below.

In the next process block 304 the search query (possibly after reformatting as discussed above) is forwarded to at least one search engine server (e.g. 110 in FIG. 1). In the next process block 306 results in the form of an answer set, which may for example comprise a list of Uniform Resource Identifiers (URI) in the case of an Internet search, are received by the collaborative search application 210. In the next process block 308 the answer set and/or original or reformatted query string is stored in a memory associated with the collaborative search server 114.

In this process block 310 a measure of the similarity of the user's query to previously queries related to published query statements and answer sets is computed. Specific approaches to calculating the measure of similarity will be described below. The calculation is based on stored query strings or answer sets associated with the Nth user, and other users who have previously submitted queries. In process block 312 the measure of similarity of the Nth users query to previously conducted queries, which may take the form of a numerical value, is compared to a threshold criterion of similarity, which likewise may take the form of a numerical constant.

In process block 314, the results of the Nth user's query are sent to the Nth user at a client computer (e.g., client 202, running on client computer 102).

Figure 4B:
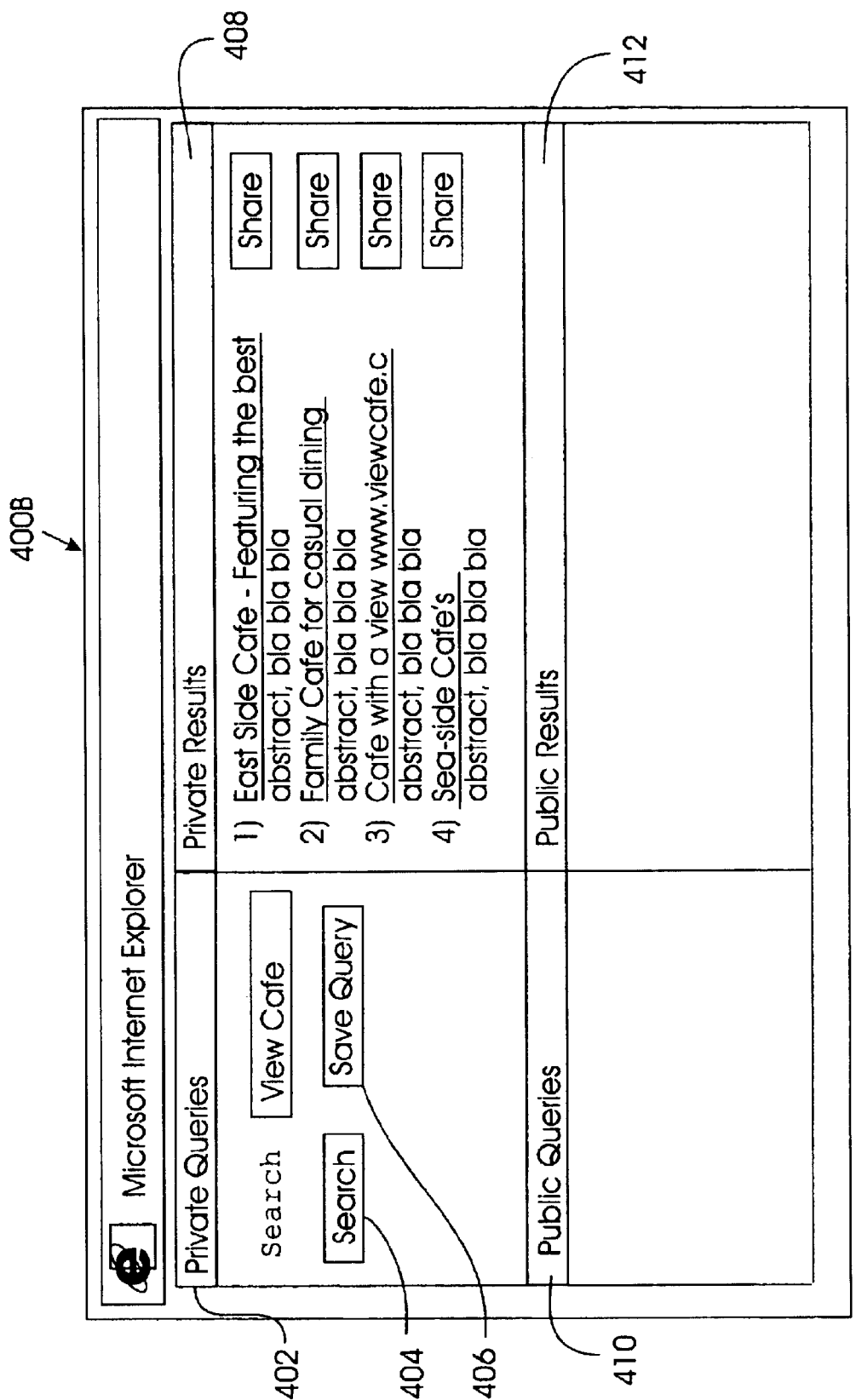
FIG. 4B is a second depiction of a GUI used in connection with the flow diagram shown in FIG. 3.

FIG. 4B shows the appearance of the GUI 400B at this point. The upper right quadrant 408 is seen in this view to contain a list of hyperlinks which comprise the answer set for the Nth users query. A scroll bar could be provided in the answer set quadrant 408, if the answer set exceeded the size that could be displayed in the given area. Note that adjacent each URI hyperlink is a "Share" button, 414.

In process block 316 input is accepted from the user through the client process 202, 204, by the collaborative search application 210,indicating whether to make public the query or the resulting answer set. Whichever is made public AND (Boolean) whichever is used for the purpose of query comparisons will be stored by the collaborative search application 210 on the collaborative search server 114. In the case that comparison is made on the basis of answers as opposed to the query statement, it is possible that only a subset of the total answer set will be stored on the collaborative search server 114 for use in making comparisons.

Figure 4C:
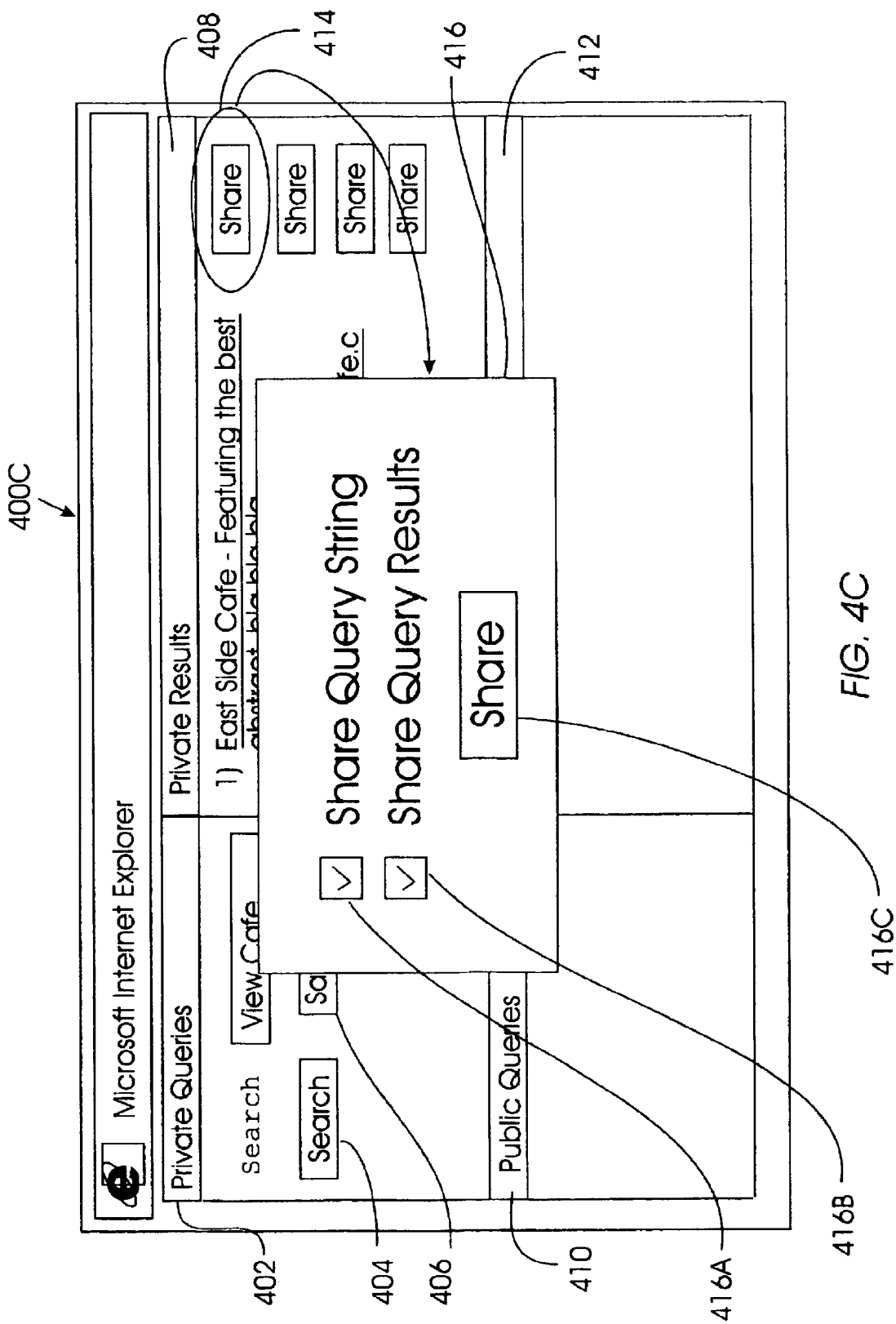
FIG. 4C is a third depiction of a GUI used in connection with the flow diagram shown in FIG. 3.

As shown indicated by the annotation of the GUI 400C in FIG. 4C activating the "Share" button 414, adjacent to the first answer causes a share dialog box 416 to be presented to the user. The share dialog box comprises two check boxes 416A, 416B used to designate to sharing the query and/or the first answer, and a share dialog box submit button 416C.

Figure 4D:
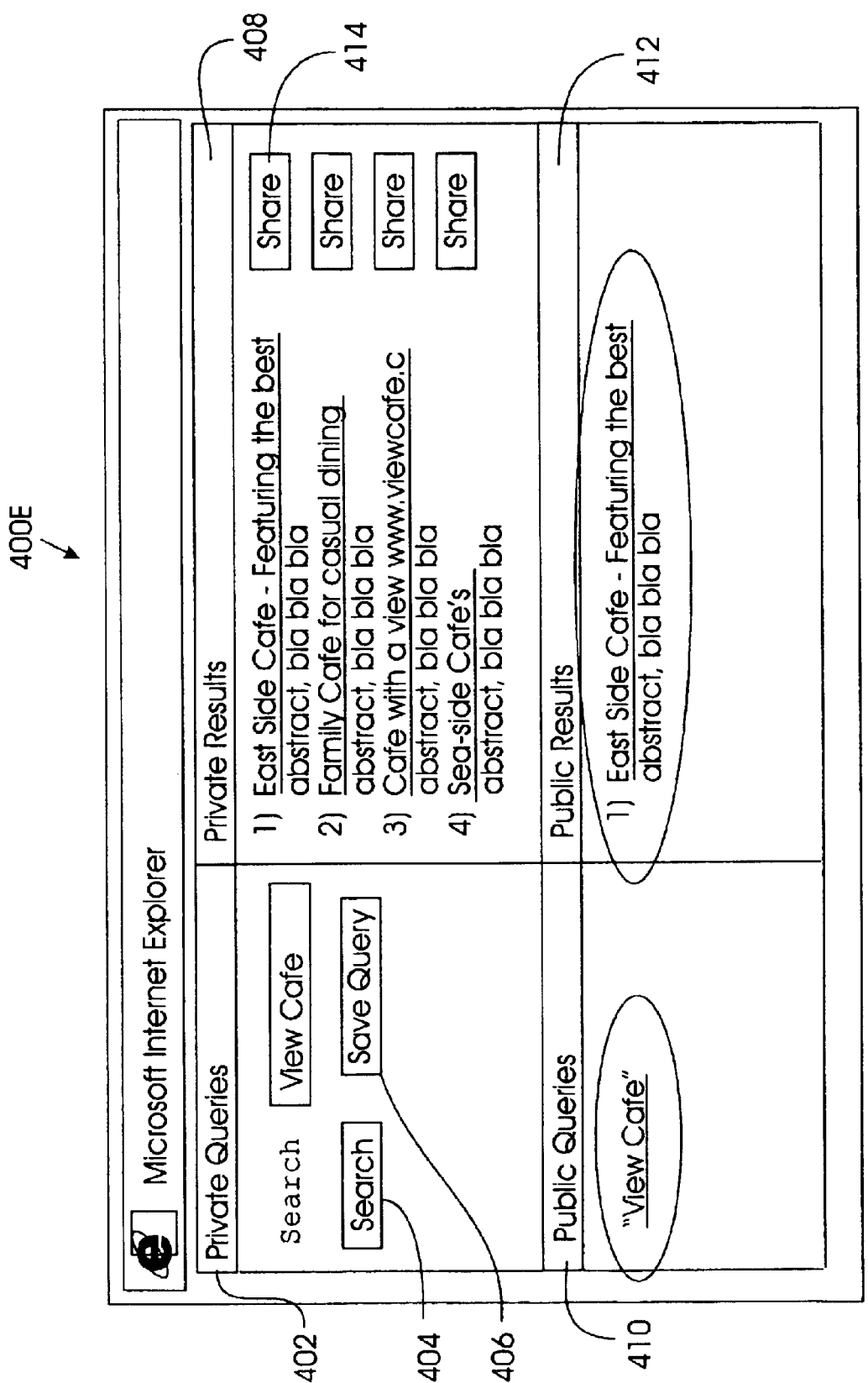
FIG. 4D is a forth depiction of a GUI used in connection with the flow diagram shown in FIG. 3.

In response to activating the share dialog submit button 416C, an HTTP message will be sent from the client process 202, to the collaborative search application which responds by transmitting back the HTML code for the GUI screen 400D seen in FIG. 4D. As seen in FIG. 4D in response to the Nth user having checked off both the check boxes, the query "view café" that the Nth user had previously entered now appears in the published query area, 410, and the "East Side Café . . . " link from the answer set now appears in the published result area 412. Importantly, the published query and the published answer will also appear in the corresponding published query and published answers areas on other clients operated by other users who's queries are sufficiently similar that they meet a predetermined threshold criterion for similarity. When other users enter queries in the future, following the flow diagram of FIG. 3 the similarity of their queries to the "view café" query will be checked, and since the query and answer set for "view café" have been published, if they meet the threshold similarity criterion, they will be transmitted to the Nth user.

In process block 318 queries and/or links to answer sets associated with queries which meet the threshold similarity criterion as determined in process block 312, and have been designated for publication by other users who conducted the queries are sent to the Nth user. For example they could be sent over bidirectional data link 104 using communication protocol 206, in Hypertext Markup Language (HTML) format.

Figure 4E:
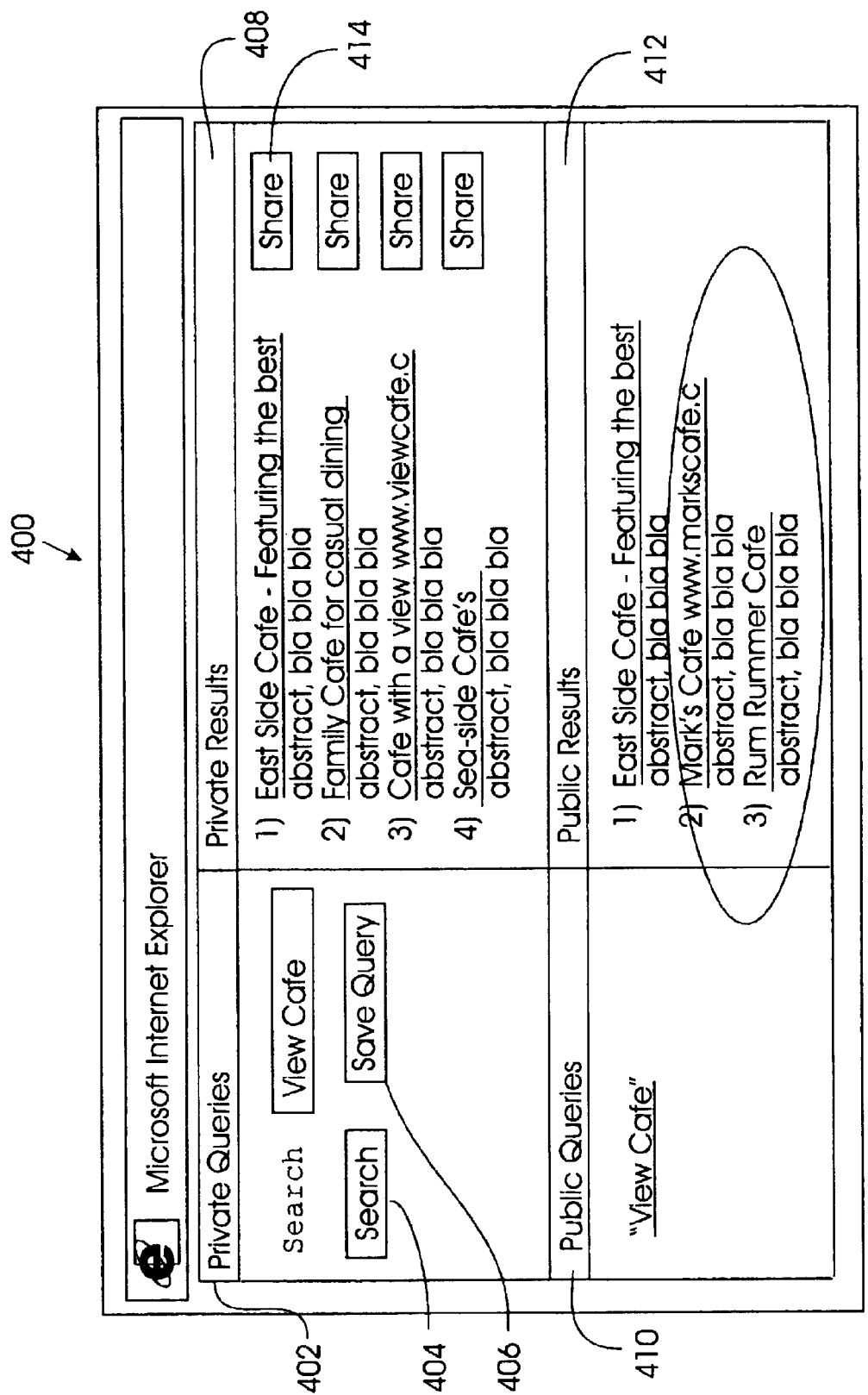
FIG. 4E is a fifth depiction of a GUI used in connection with the flow diagram shown in FIG. 3.
Figure 4F:
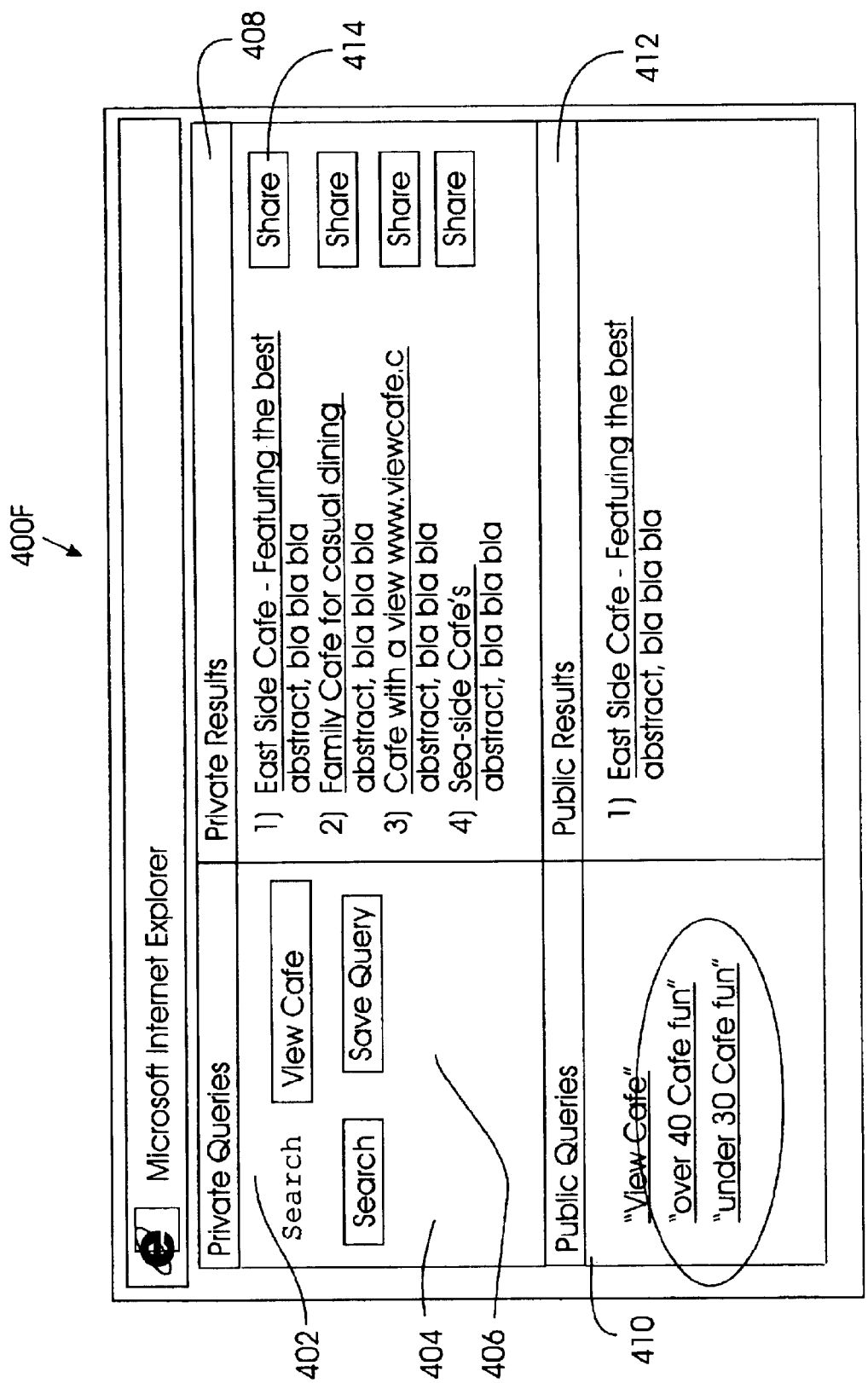
FIG. 4F is a sixth depiction of a GUI used in connection with the flow diagram shown in FIG. 3.

FIG. 4E shows a version of the GUI screen 400E in which published answers obtained by other users in response to queries that meet the threshold similarity criterion, as determined in step 312, are displayed on by the Nth users client 202. FIG. 4F on the other hand shows a version of the GUI 400F in which published query statements entered by other users related to queries that meet the threshold similarity criterion, as determined in step 312, are displayed on by the Nth users client 202. It is of course possible that both queries related to published query statements and published answers will meet the similarity criterion and will be displayed in the GUI by the client 202.

Thus according to process described above in connection with FIG. 3, users are able to obtain the benefit of gaining access to queries and/or answer sets obtained by other users in connection with similar searches.

The method described above with reference to FIG. 3 could be embodied in software loaded onto the collaborative search server 114 from one or more memory disks 120.

Exemplary Method For Matching up Users Having Shared Interests, And Establishing Chat Sessions Between Those Users Referring to FIG. 5 a method for matching up users having common interests based on searches that they perform, and initiating chat sessions between the users is shown. The software interrelationships illustrated in FIG. 2 are applicable to the method to be described in connection with FIG. 5. The flow diagram shown in FIG. 5, is shown from the point of view of the collaborative search application, 210 which performs most of the processing, according to the embodiment to be described. The collaborative search application 210 to be used in connection with the method described in connection with FIG. 5, is to include functionality or be in communication with a process for managing Internet chat sessions. The computer system schematically shown in FIG. 1 is equally applicable to the process shown in FIG. 5.

In process block 502, a user ID is accepted from a user (to be referred to hereinafter as the "kth" user). The user ID can then be associated by the collaborative search application 210, with the IP address of the client used by the kth user, e.g., client 1, (202). Alternatively, in response to the user entering an ID the collaborative search application 210 could set a cookie at the client 1, (202), which uniquely identifies the user to the collaborative search application. Identification will allow the collaborative search application to locate the user in case other users with similar interests are later detected. Other information such as the users real name and email address may have been previously entered and stored by the collaborative search application.

In process block 504, a query string is accepted from the user. The query statements might include a variety of elements depending on the capabilities of the search engine 212. For example the query statement may comprise boolean operators, term weights (i.e., in a weighted sequence of terms), wild card characters, and proximity operators.

In the process block 506, the query is forwarded to a search engine, e.g., 212. The search engine could be run on the same physical machine as the collaborative search application or, in fact, could be closely integrated therewith.

In process block 508, after the search engine has completed the search, the results are received by the collaborative search application.

In the next process block 510 the search results are stored with information associating them with the kth user's ID. Although, it is preferred to compare search queries based on the search results (i.e., answer sets), in which case it is appropriate to store the search results as is done in process block 510, it is also possible to compare search queries based on the query string itself, in which case it would be appropriate to store the query string with information associating it with the user ID. The latter could be done at this point in the flow diagram or at an earlier point after the query string is received in process block 504.

In the process block 512 the search results are forwarded to the client process 202 for viewing by the kth user. In the preferred case that the client process 202 takes the form of a web browser, the results could be formatted in HTML format.

Figure 6A:
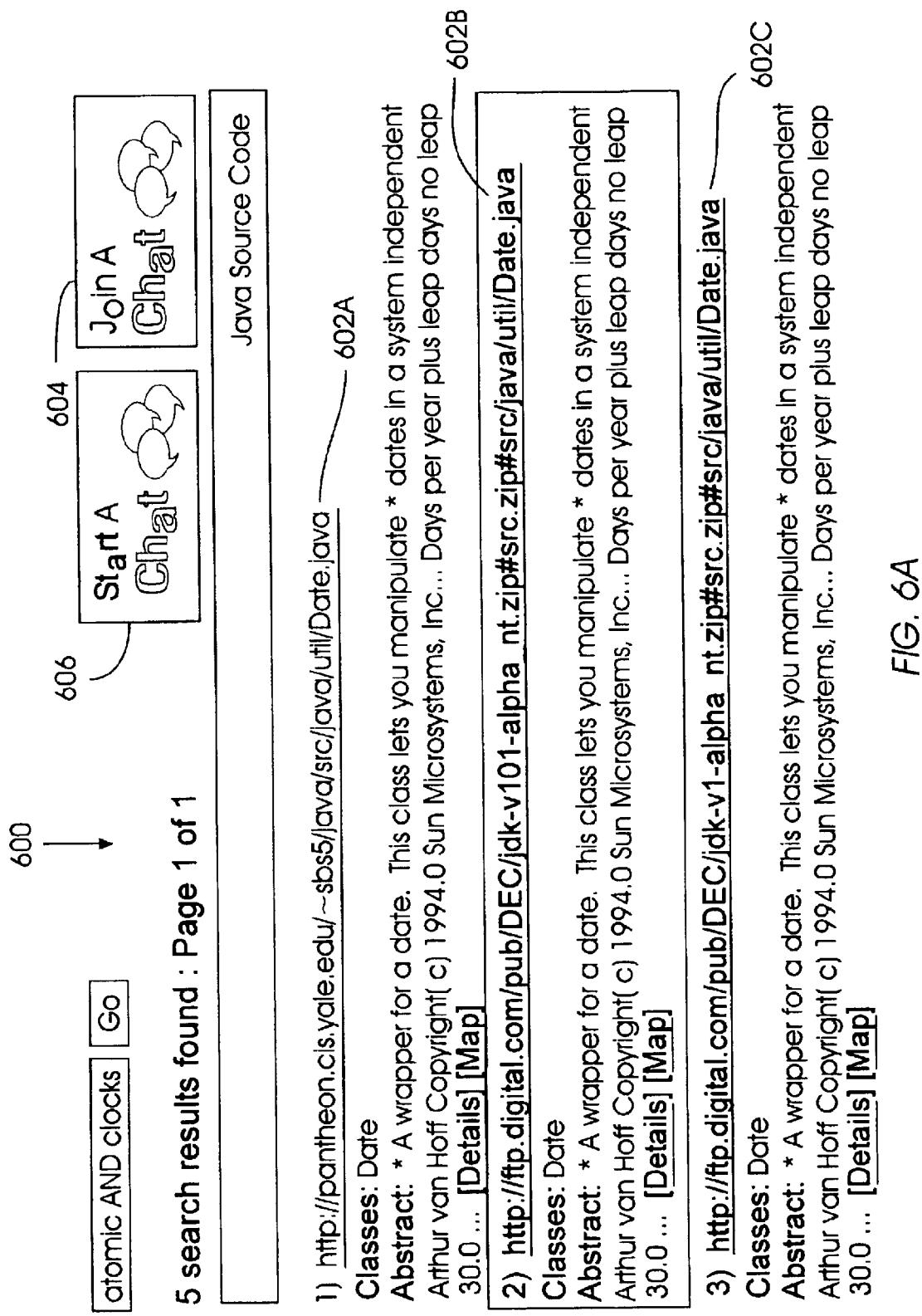
FIG. 6A is a depiction of a first GUI used in connection with the method depicted in FIG. 5.

In the case of HTML formatted results, it is further preferable to include in the web page listing the results, two hyperlinks to be used for initiating and joining Internet chat sessions related to the topic of the user's search. The two hyperlinks would reference CGI components of the collaborative search application for initiating and managing chat sessions. Referring to FIG. 6A, an exemplary web page 600 including a number of search result URI's 602A, 602B, and 602C, a "join a chat" button 604 and a "start a chat" GUI button 606 is shown.

Process block 514, is a decision block, the outcome of which depends on whether the user decides to join an existing chat. If the user elects to join an existing chat, e.g., by activating the "start a chat" GUI button 606, then the process flow proceeds to process block 606. It is should be understood that in the case of implementing the invention using common gate way interface (CGI) based collaborative search application front end, the application will wait for either GUI button 606, or 608 to be depressed, and proceed accordingly. In this type of event driven program, there need not be an explicit IF THEN structure in the collaborative search application which determines if the user would like to join an existing chat.

In process block 516 measures of similarity between the kth user's query and queries that are associated with ongoing chats are computed based on query related information previously stored in connection with those chats. As mentioned above it is preferable to measure the similarity of the kth user's query to other queries based on the answer sets of the respective queries. A number of methods for doing so will be described below. It is also possible to compute the measure of similarity based on the query string.

In process block 518 the measures of similarity computed in the preceding process block are compared to a threshold criterion. The measures of similarity could be numerical values, and the threshold criterion a numerical constant. The measure of similarity could be a number which increase as the level of similarity increases. In which case the threshold criterion will simply be a minimum value. It is possible to provide a user interface, e.g., HTML select menu to allow the user to set the threshold criterion, for example, at the time that the user requests to join a chat or at the time that the user submits the search.

Figure 6B:
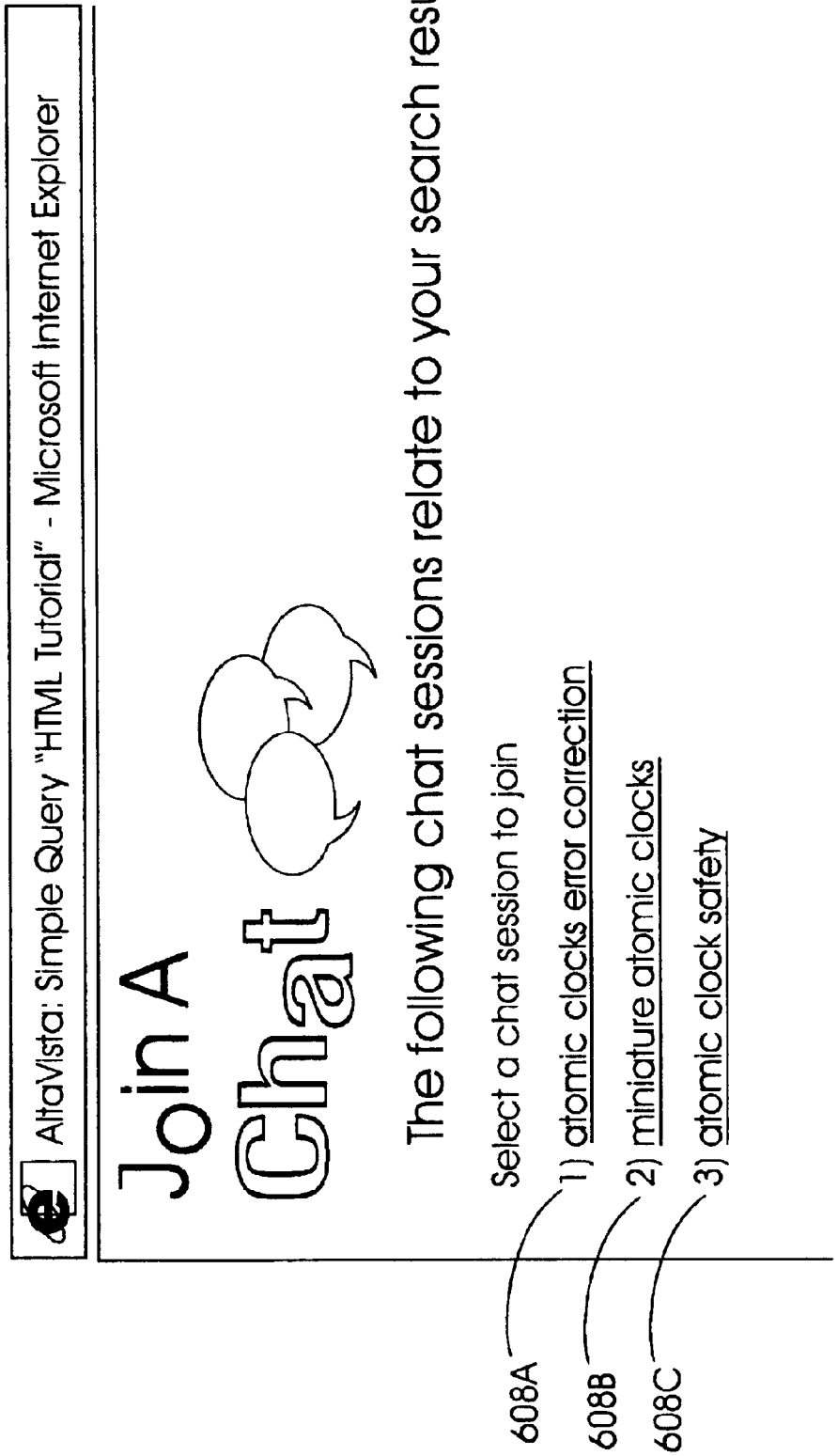
FIG. 6B is a depiction of a second GUI used in connection with the method depicted in FIG. 5.

In process block 520, a listing of ongoing chats that meet the threshold similarity criterion is sent to the kth user via the first client, 202. In the case of that client 202 is a web browser the listing can be sent as a web page comprising links to various chats. Referring to FIG. 6B, such a HTML page 607 is shown. The web page is seen to comprise hyperlinks 608A, 608B, and 608C to a number of different chat rooms. In process block 522, selection of one of the existing chat session is accepted from the kth user. The selection is made by clicking one of the hyperlinks 608A, 608B, and 608C.

In process block 524 the user is placed in the selected existing chat room. The client side chat session interface may be implemented as a Java applet, which runs within the client, 202 browser.

Figure 6C:
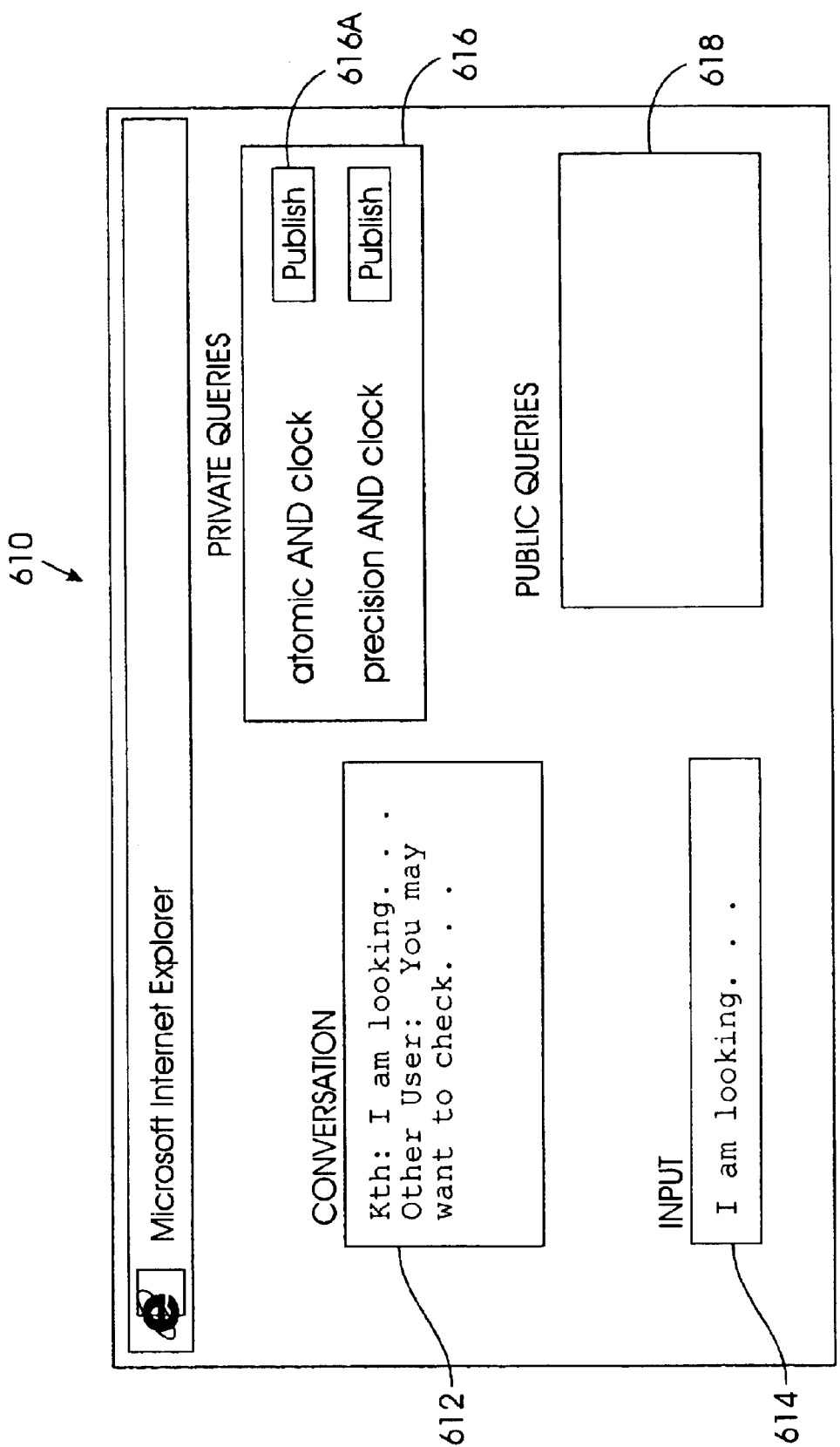
FIG. 6C is a depiction of a third GUI used in connection with the method depicted in FIG. 5.

Referring to FIG. 6C an exemplary GUI chat session interface 610 is shown. The chat session interface comprises large text window 612 in which messages typed by the participants of the chat appear in chronological order in near real time, and a smaller text box 614 into which the kth user may type his messages which are then echoed to the large text box 612 on the kth user's client, e.g., client 202 and the large text boxes of the chat applets running on the clients of the other chat participants. The chat window also comprises a private query window 616 in which the kth user's queries are listed. At the time that the chat is initiated and the chat session interface is opened, the kth user's queries for the present search session, may be retrieved by the collaborative search application from memory associated with the collaborative search server 114 and written to GUI box 616. Adjacent each query is a query "publish" button 616A, activation of which causes the query to be transmitted through the chat manager function of the collaborative search application to other participants of the chat, and listed in the public query box 618. Thus, the chat session interface allows to exchange thoughts and interesting URI's that have been identified by individual users.

If in process block 514, the kth user elects not to join an existing chat, the process proceeds to process block 524. Process block 524 is a decision block, the outcome of which depends on whether the user decides to start a new chat, e.g., by activating GUI button 606 on FIG. 6A. If the user elects to start a chat, in process block 528, a measure of similarity of the kth user's query to queries performed by other users of the system is calculated. In process block 530 the calculated measures of similarity are compared to a threshold similarity criterion.

Optionally, in response to activating the GUI button 606 to start the chat, the user, could be prompted to indicate a degree of similarity to be used in determining candidates for his chat. The threshold similarity criterion can then be construed from the degree of similarity. For example the user could be given the choices "similar" or "very similar" and the collaborative search application could associate a certain numerical value of the threshold criterion with each choice.

In process block 532, the statuses of users whose queries meet the similarity threshold are checked. Some users may be found to be presently using the collaborative search application, whereas others may have logged out.

In process block 534, a list identifying other users, (e.g., by user ID) whose queries meet the threshold similarity criterion, along with information indicating the current status of the user is sent to the kth user. The status information associated with the other users may include an indication of whether each other user is currently working on the search which was matched to the kth user's search (e.g., viewing the results), and whether or not each other user is still using the collaborative search application. (As indicated above the first step in using the system is to enter, a user ID. A logout procedure may also be provided so that the collaborative search application is able to determine what users are currently active.)

Figure 6D:
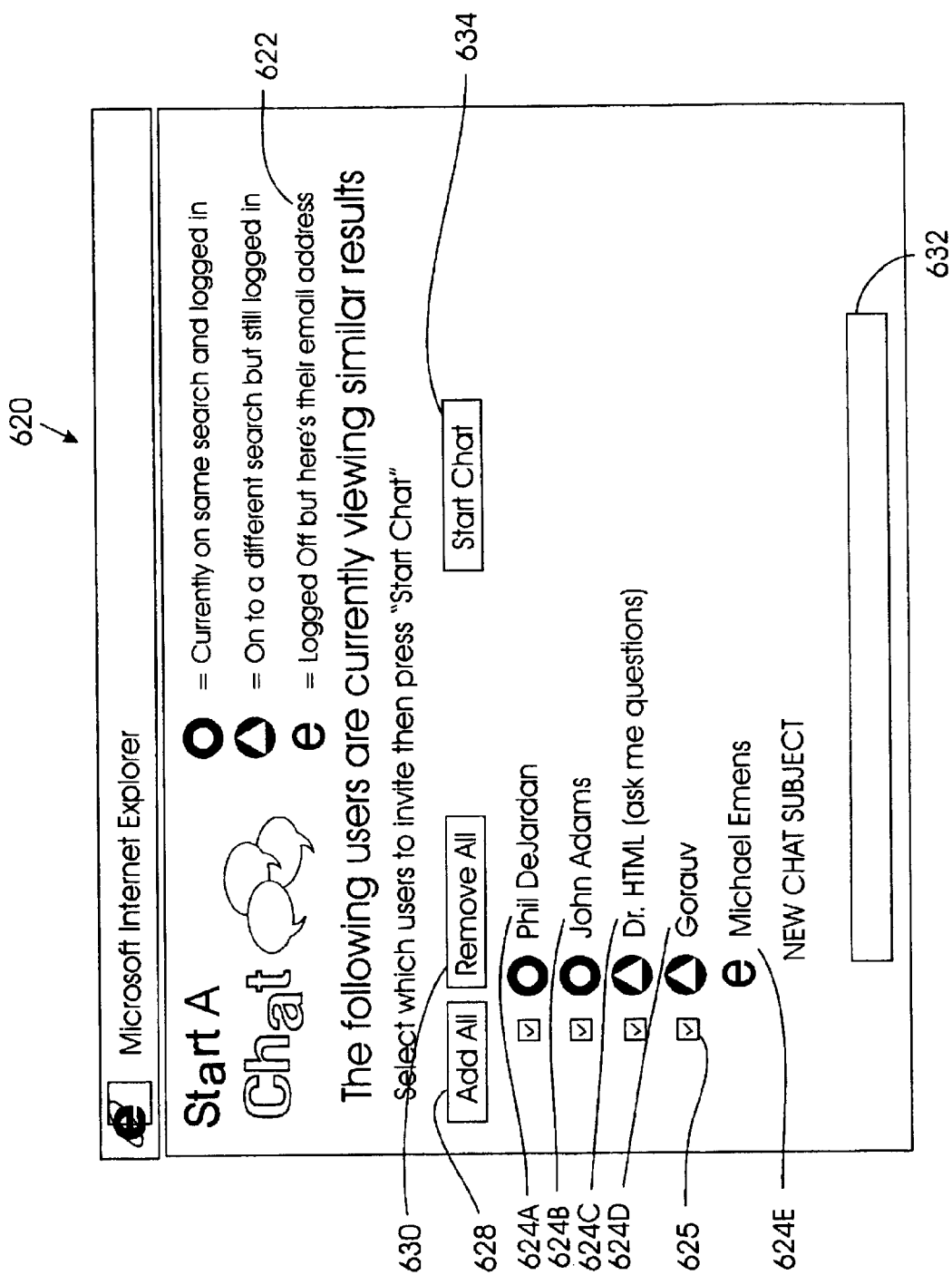
FIG. 6D is a depiction of a fourth GUI used in connection with the method depicted in FIG. 5.

Referring to FIG. 6D an exemplary GUI 620 which displays the information transmitted in block 534 to the client process 202 is shown. The GUI display includes a legend 622 which indicates the meaning of symbols used to indicate the status of other user's. The exemplary statuses are "currently on the same search and logged in", "On to a different search but still logged on", and "logged off but here's their email address". The GUI display further comprises the list of users 624A, 624B, 624C, 624D, and 624E whose queries meet the threshold similarity criterion. Adjacent each users real name or ID is a symbol from the legend 622 indicating the status. If the status indicated is "logged off but here's their email address", as in the case of user "Michael Emens" 624E, the name or ID will appear as a hyperlink which the kth user may click in order to open up a email composition window addressed to that user. A set of check boxes 626 are provided adjacent the names or ID's of users who are currently logged on to the system so that the kth user can indicate which users to invite to chat. Additionally an "Add All" button 628, is provided to check all the check boxes, and a "Remove All" 630 button is provided to reset all of the check boxes 626 to the unchecked state. A text box 632 is provided for the kth user to enter in a subject name for the new chat. A start chat button 634 is used to invite the checked other users to commence a new chat with the name indicated in the subject text box 632.

Figure 5A:
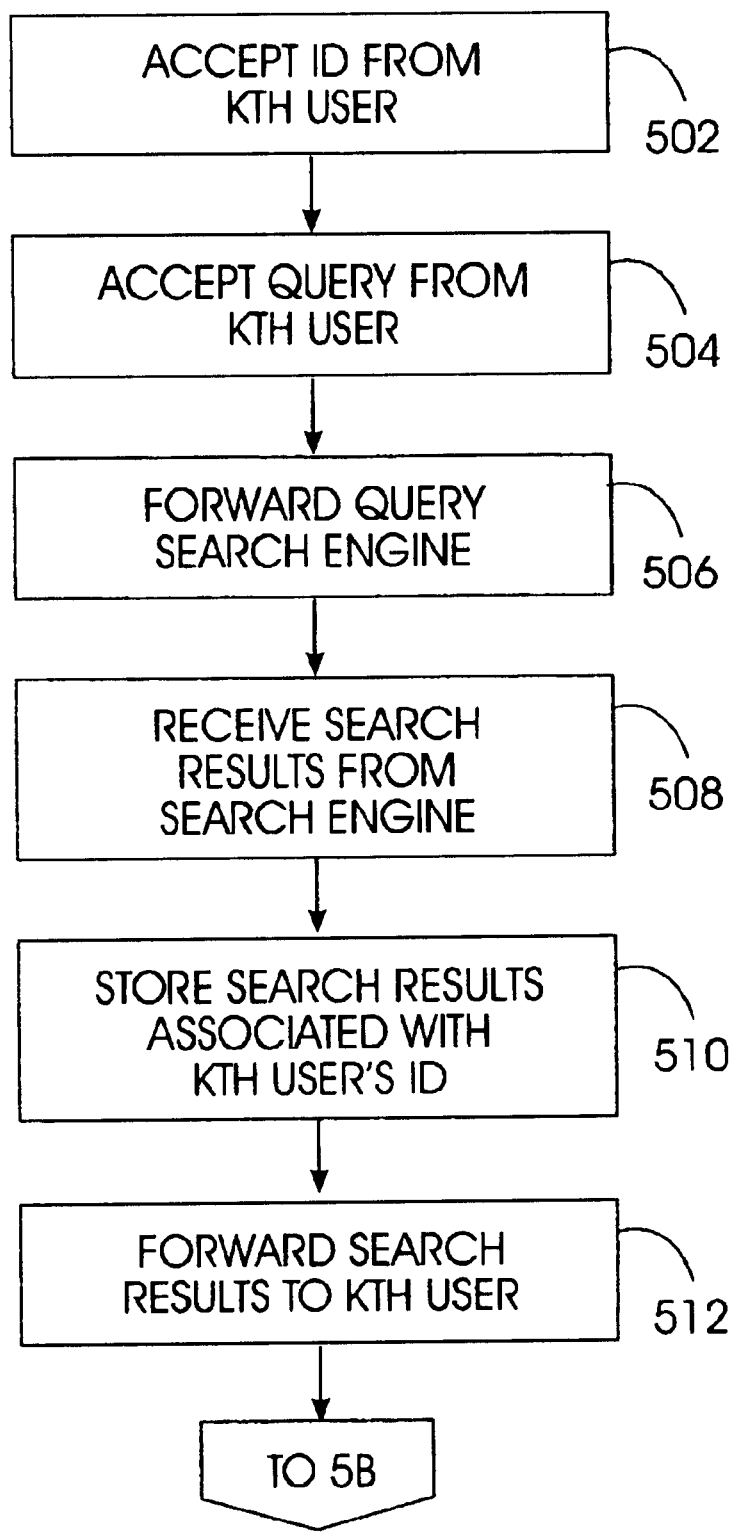
FIG. 5A is a flow diagram of a first part of a method for matching up users in chat sessions based on the similarity of their queries.
Figure 5B:
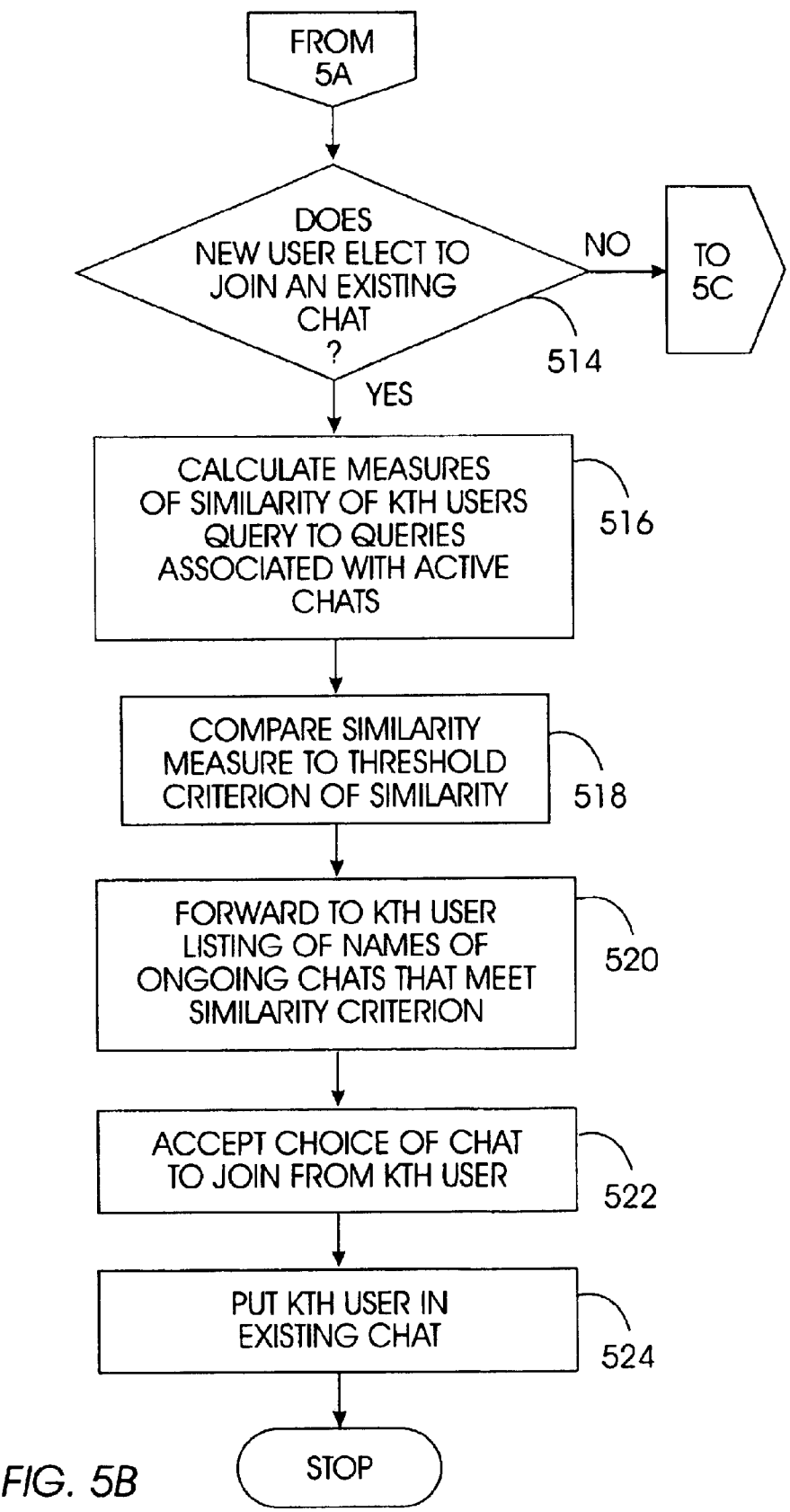
FIG. 5B is a flow diagram of a second part of a method for matching up users in chat sessions based on the similarity of their queries.
Figure 5C:
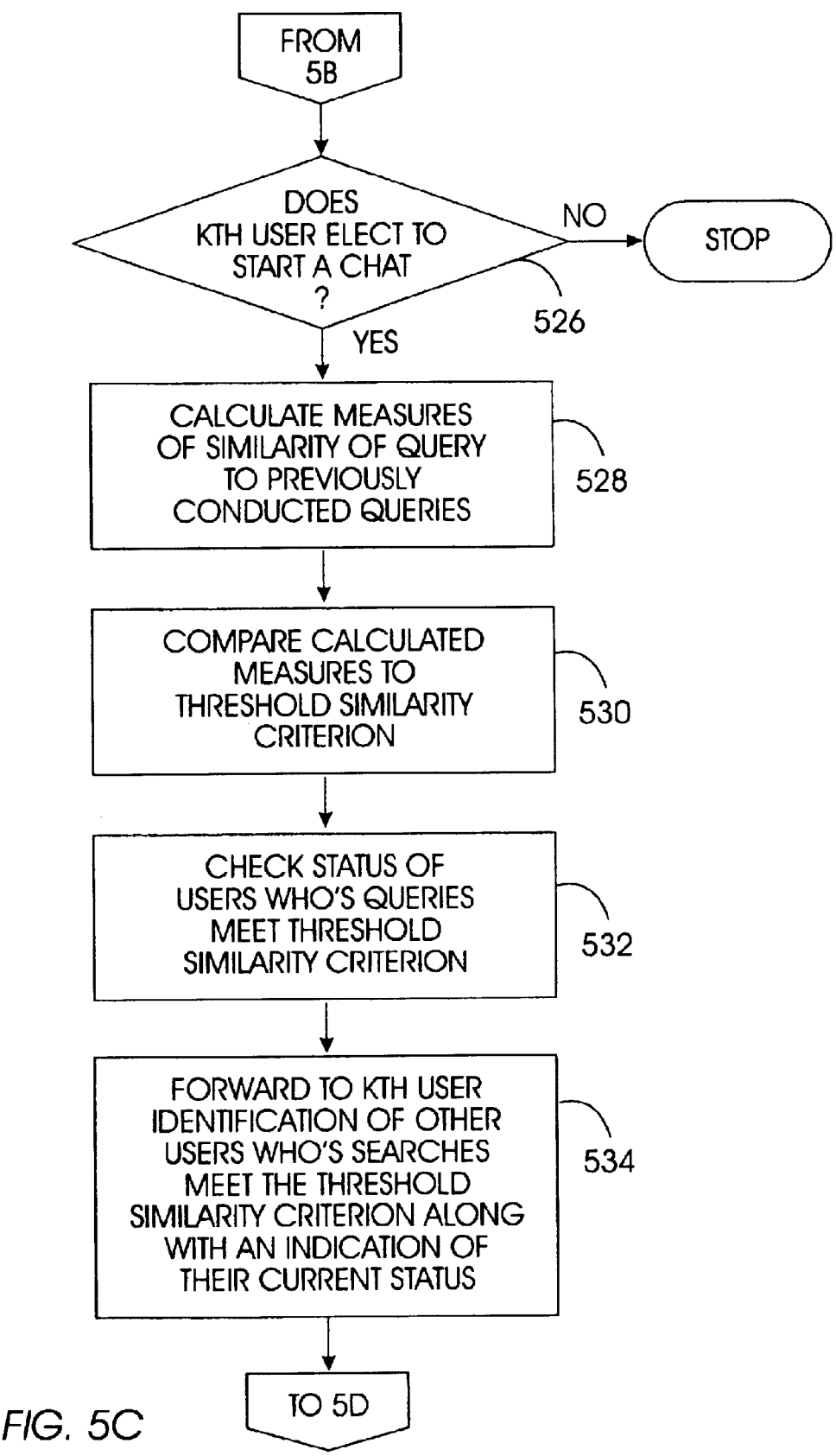
FIG. 5C is a flow diagram of a third part of a method for matching up users in chat sessions based on the similarity of their queries.
Figure 5D:
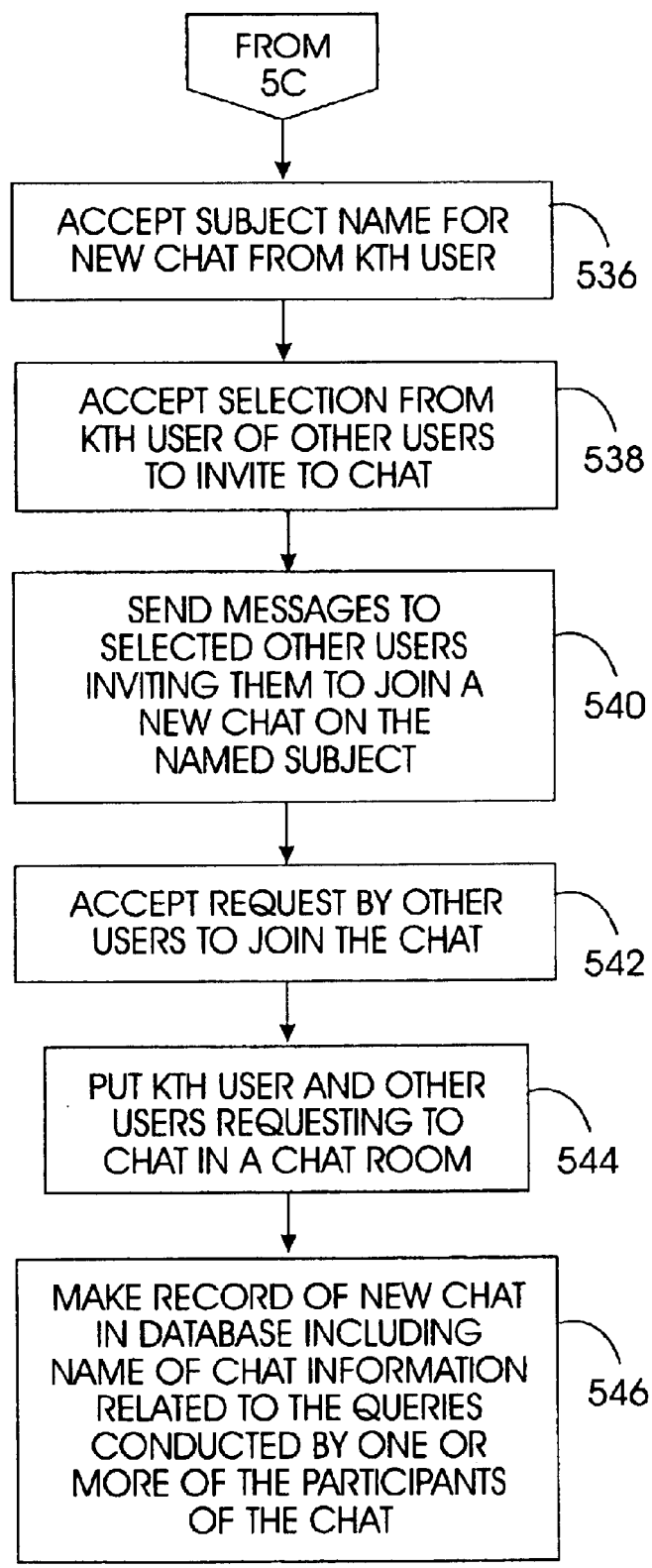
FIG. 5D is a flow diagram of a fourth part of a method for matching up users in chat sessions based on the similarity of their queries.

Referring again to the flow diagrams in FIG. 5D, in process block 536 a name for the new chat session is received from the kth user. In process block 538 the selection of the kth user of other users to invite to engage in a chat session is accepted by the collaborative search application. Note that the information collected in process blocks 536 and 538 may be sent in one HTTP message in response to activation of the start chat button 634 on web page 620.

In process block 540, in response to receiving the request to initiate a chat from the kth user, the collaborative search application sends messages to the selected other users, inviting them to chat. This invitation may appear in the form of a new web browser window containing a web page which bears a written invitation to join the chat indicated by subject name, and contains a link (e.g. button) for accepting the invitation. In response to activating the link, the user for accepting the invitation, a message will be sent from the other user's client to the collaborative search application indicating that the other user would like to join a chat. The link, can for example, reference a CGI component of the collaborative search application which will cause a chat session interface e.g, 610 of FIG. 6C to be sent to and loaded by the other users client, e.g., client 2, 204 in FIG. 2.

In process block 542, requests by other users to join the chat is accepted.

In process block 544, all users requesting to join the chat are put in chat room, e.g., a common channel is set by the collaborative search application up to receive messages from the chat session interface of each user participating in the chat and echo those messages to all the other users who are participating the chat.

In process block 546, a record is made by the collaborative search application of the chat session in a memory of the collaborative search server 114. The record may include the subject name selected by the kth user and information related to the query of one or more of the participating users. The latter will be used by the collaborative search application to compare future users query's to the subject of the ongoing chat in order to determine if the future user should be informed of the chat, as the kth user was informed of existing relevant chats in process block 520. Preferably the information used for comparison includes one or more of the answer sets of the users participating in the chat, and may conveniently include the kth user's answer set. It might also comprise a combination of answer sets from different users, e.g., a union, intersection or sampling.

Exemplary Method For Computing a Measure of Similarity of Two Answer Sets

Figure 7:
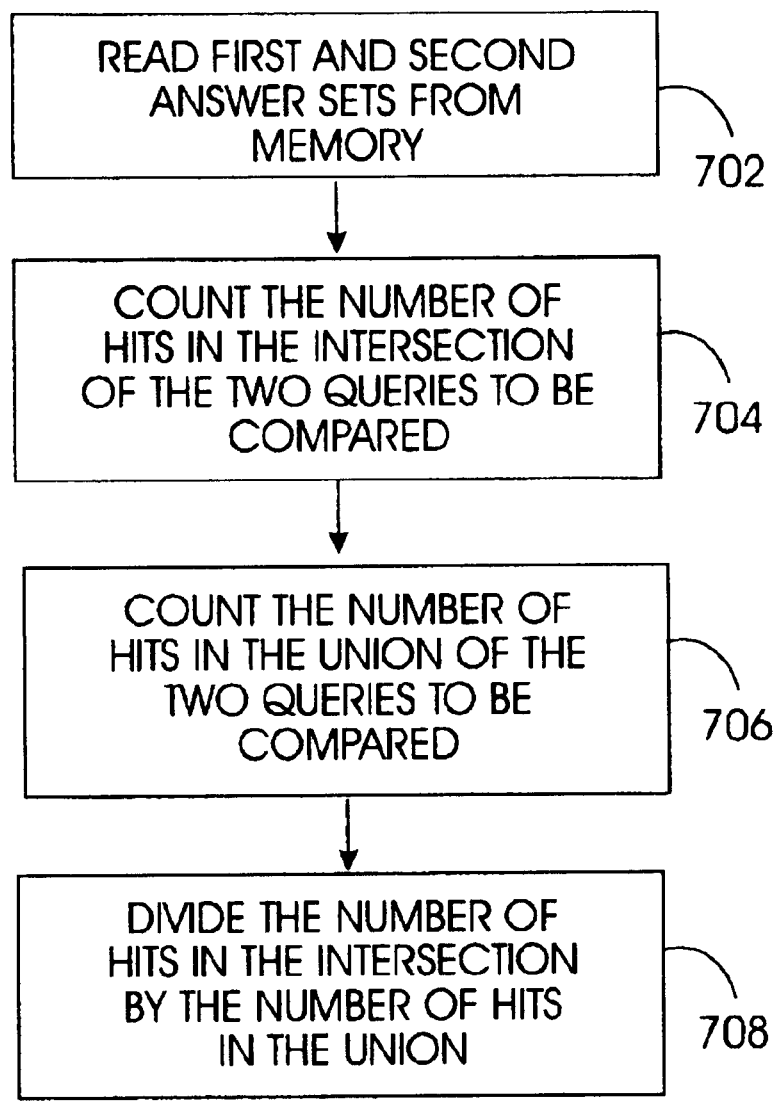
FIG. 7 is a flow diagram of a method for deriving a measure of similarity of two queries based on their answer sets.

Referring to FIG. 7 a flow diagram of a method for deriving a measure of similarity between two queries based on their answer sets is shown. In process block 702 two answer sets associated with two queries are read from a memory means, e.g., a memory associated with the collaborative search server 114.

In process block 704 the number of answers (or "hits") that are common to the two answer sets, in other words to use the set theory terminology the number of hits in the "intersection" of the two answer sets is counted. One approach is to check if each answer in the one answer set appears in the other answer set.

In process block 706 total number of unique hits in the answer sets, in the terminology of set theory the number of hits in the "union" of the two answer sets is determined.

In process block 708, the count of the intersection set is divided by the count of the union set, and the quotient is taken as a measure of similarity of the two answer sets.

Thus, in mathematical notation the measure of similarity computed by the process shown in FIG. 7 is:

$$\frac{|A \cap B|}{|A \cup B|}$$

Where A represents a first answer set and B represents a second answer set.

Determining the measure of similarity on the basis of the answers sets is advantageous in that the measure is then independent of the type of query string used. This then permits the collaborative search application to accept queries in a variety of formats, e.g., natural language, boolean statements, weighted sequences, including right or left truncation or other types, without creating the need for complex algorithms and great computational effort in order to deduce the similarity of two queries of different type. This also facilitates using the collaborative search application as a gateway to a variety of distinct search engines each of which calls for a different syntax without sacrificing the ability to compare different users queries. If the kth user uses one syntax for accessing a first search engine and another user used another syntax in using a second search engine, no difficulty is presented in comparing the two users queries. This possibility of using the collaborative search engine as a gateway to individual search engines, is somewhat different from using it as a meta search server which may accept a query statement in a single format and convert it into a plurality of different formats and forwards the reformatted query to a number of search engines.

Exemplary Method for Computing Similarity of Two Answer Sets Based on Subsets

Figure 8:
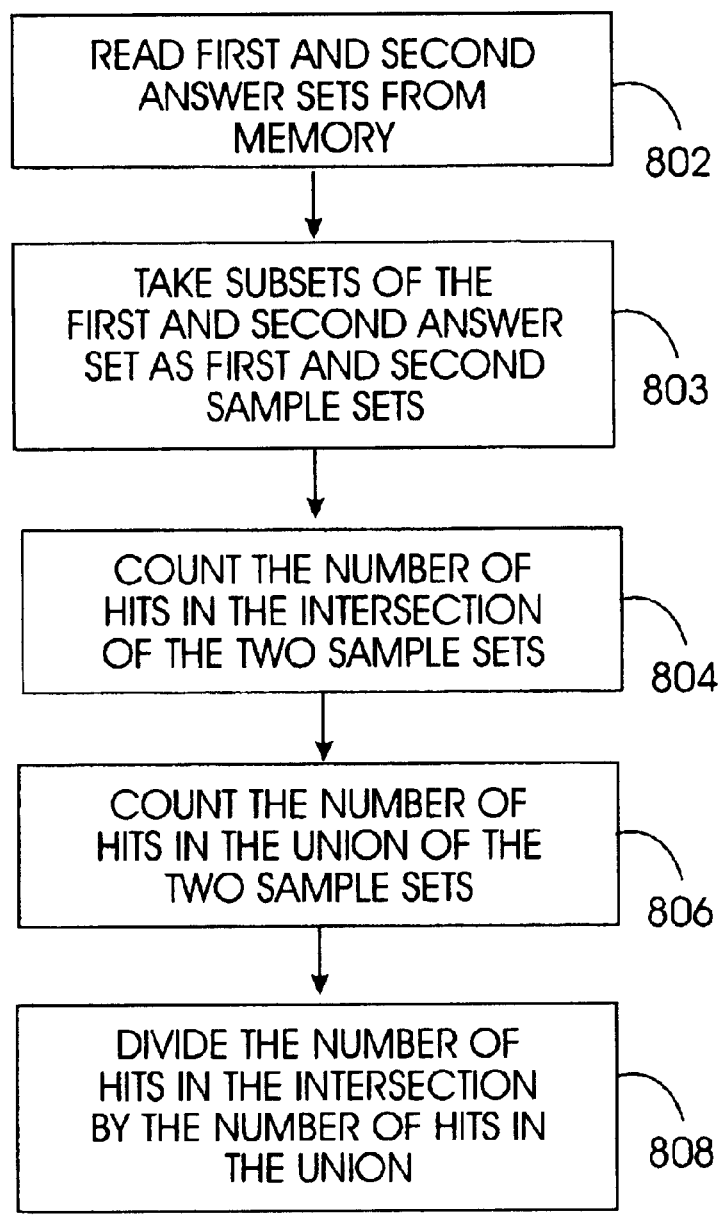
FIG. 8 is a flow diagram of a method for deriving a measure of similarity of two queries based on samples of answer sets.

Referring to FIG. 8, a method for computing the similarity of two queries based on subsets of the answer sets is shown. Process blocks in FIG. 8 and FIG. 7 which are designated by reference numerals having the last two digits in common perform the same function. Reference is made to the description of FIG. 7, for the functioning of corresponding process blocks in FIG. 8. A new function performed according to the method shown in FIG. 8, is performed in process 803. In process block 803, a subset of up to certain predetermined size is extracted from each of the two answer sets to be compared. The subset preferably comprises 5 to 50 answers but other ranges larger and smaller can be used. The remainder of the process is based on those subsets. This provision avoids the computational expense of having to form the union and intersection of the entire answer sets which in the case of Internet search engine queries can be exceedingly large. The subset is preferably chosen to include hits taken from the top of the answer set, e.g., a sequence of consecutive hits including the first hit. The latter choice is advantageous since the content of the hits near the top of the answer set tend to be more relevant to the intended subject of the query.

Exemplary Method to Compute a Similarity of Two Queries Based on a Sampling of the Answer Sets and Taking into Account the Score of Each Answer in Each Answer Set A number of existing search engines associate a score, e.g., a number between zero and one, often expressed as a percent with each answer.

In the method to be described, the scoring of the answers is taken into account in measuring the similarity of two queries using the answer sets. In particular, according to the method, the closer the score of each answer that appears in the two answer sets is in the two answer sets is, the more similar the two queries are considered. For example, if two answer sets contain answers X and Y, and if in the first and second answer sets X is given a score of 0.83 and Y is given a score of 0.5, the two answer sets would be considered more similar than if X had a score of 0.83 in the first answer set and a score of 0.5 in the second answer set, and for Y the scoring in the respective answer sets was reversed.

Figure 9:
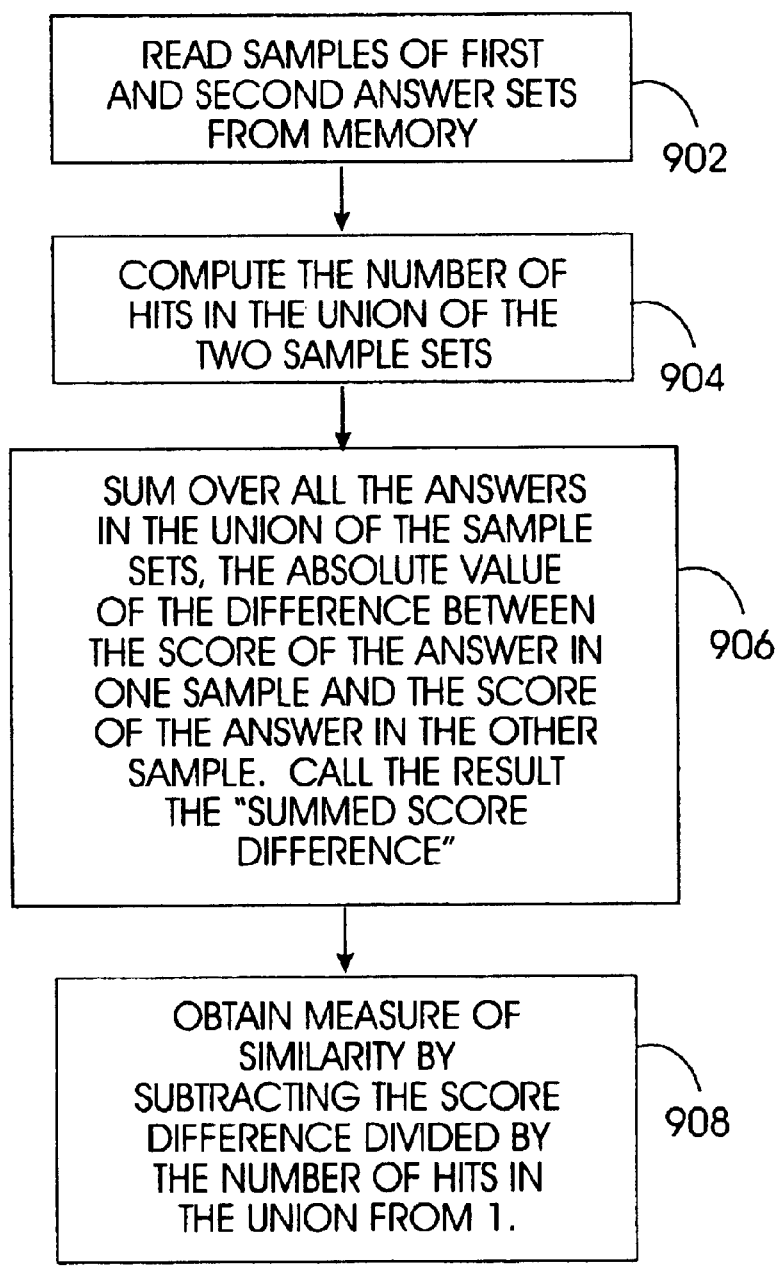
FIG. 9 is a flow diagram of a method for deriving a measure of similarity of two queries based on samples of the answer sets that takes into account the scoring of answers in the sample sets.

Referring to FIG. 9, in the first process block 902, samples of the first and second answer sets are read from memory. The samples may preferably comprise answers selected from the top of the answer sets. In the next process block 904 the number of answers in the union of the two samples sets is determined.

In the process block 906 a sum is taken over all the answers in the union of the two sample sets, of the absolute value of the difference between the score of each answer in the first answer set and it's score in the second answer set. The similarity is termed the "summed score difference". If a particular answer does not appear in one of the answer sets, it's score in that answer set is considered zero.

In the process block 908 a measure of similarity of the two queries is determined by subtracting from unity the score difference divided by the number of answers in the union of the two sample sets. Expressed mathematically, the measure of similarity computed by the process shown in FIG. 9 is:

$$1 - \frac{\sum_{Xi \in (A \cup B)} |S(Xi, A) - S(Xi, B)|}{|A \cup B|}$$

where, Xi is a particular answer that appears in both sample sets;

A is a first answer set;

B is a second answer set;

S(Xi, A) is the score of the Xi answer in the A answer set; and

S(Xi, B) is the score of the Xi answer in the B answer set.

The foregoing measure of similarity above is merely exemplary as other formulas with similar properties can be constructed by a person of ordinary skill in the art. For example in lieu of taking the absolute value of the score difference, the score difference could be squared or raised to the fourth power. Some properties of the above indicated formula are it depends on the magnitude of the score difference not the sign, and it has the same sign derivative with respect to all of the score differences.

Exemplary Method to Compute the Similarity of Two Queries Based on Inferred Scoring Certain search engines do not return a score, with each answer, however they do order the answers in order of relevance, as determined by their own internal heuristic rules. The method to be described, takes into account the relative relevance of each hit inferred from the ordering of the hits.

Figure 10:
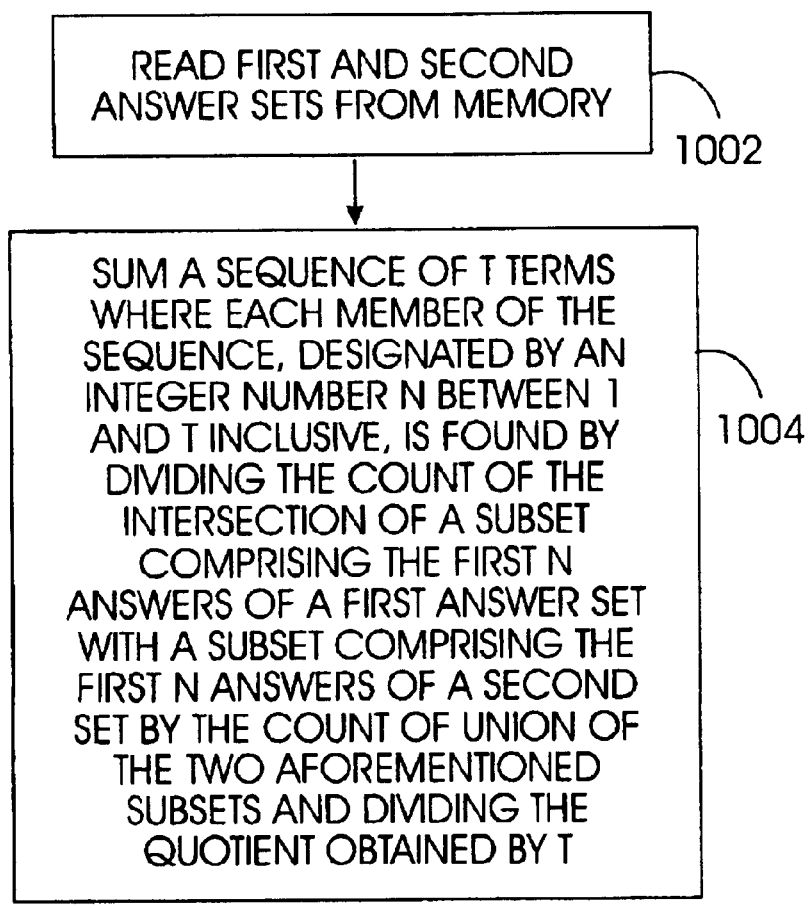
FIG. 10 is a flow diagram of a method for deriving a measure of similarity of two queries based on samples of the answer sets that takes into account scoring of the answers inferred from their ordering.

Referring to FIG. 10, in the first process block 1002 the first and second answers sets, or subsets thereof are read from memory. In the second process block a measure of the similarity of the two answer sets is obtained as the sum of a sequence of T terms where each member of the sequence, designated by an integer number N between one and T inclusive, is found by dividing the intersection of a subset comprising the first N answers of a first answer set with a subset comprising the first N answers of a second set by the union of the two aforementioned subsets and dividing the quotient obtained by T. Expressed mathematically, the measure of similarity is:

$$\frac{1}{T} \times \sum_{N=1}^{T} \frac{|A_N \cap B_N|}{|A_N \cup B_N|}$$

where, $A_N$ is a subset of the first answer set consisting of the first N hits;

$B_N$ is a subset of the second answer set consisting of the first N hits; and

T is a positive integer value, preferably greater than unity.

As an example consider a first ordered answer set [URI1, URI2, URI3, URI4] and a second answer set [URI4, URI3, URI2, URI1]. Taking T=4, and applying the preceding formula, one obtains as the measure of similarity, (0/2+0/4+2/4+4/4)/4=3/8. As a second example consider a first ordered answer set (URI1, URI2, URI3, URI4) and a second answer set (URI4, URI2, URI3, URI1). Applying the preceding formula one obtains (0/2+1/3+2/4+4/4)/4=11/24. It is noted that a characteristic of the measure of similarity obtained by the preceding equation, is that it puts emphasis on the leading answers, since the earlier the answer appears in an answer set, the more terms it affects in the sum. Thus the scoring implied in the ordering is taken into account.

The value of T can be selected by a person implementing the invention, taking into consideration the computational expense of computing the unions and intersection involved in the measure of similarity. Also by routine experimentation with different values of T, a person of ordinary skill in the relevant arts may find that for certain data bases certain values of T tend to give better indications of similarity. For an Intranet, or specialized Internet database, e.g., a database accessed by a search engine specialized in finding Java code, for example, the value of T that is judged to result in the best measure of similarity may be different from the value of T that works best for a database of widely varying topics, e.g., the database, used by a general Internet search engine.

Figure 11:
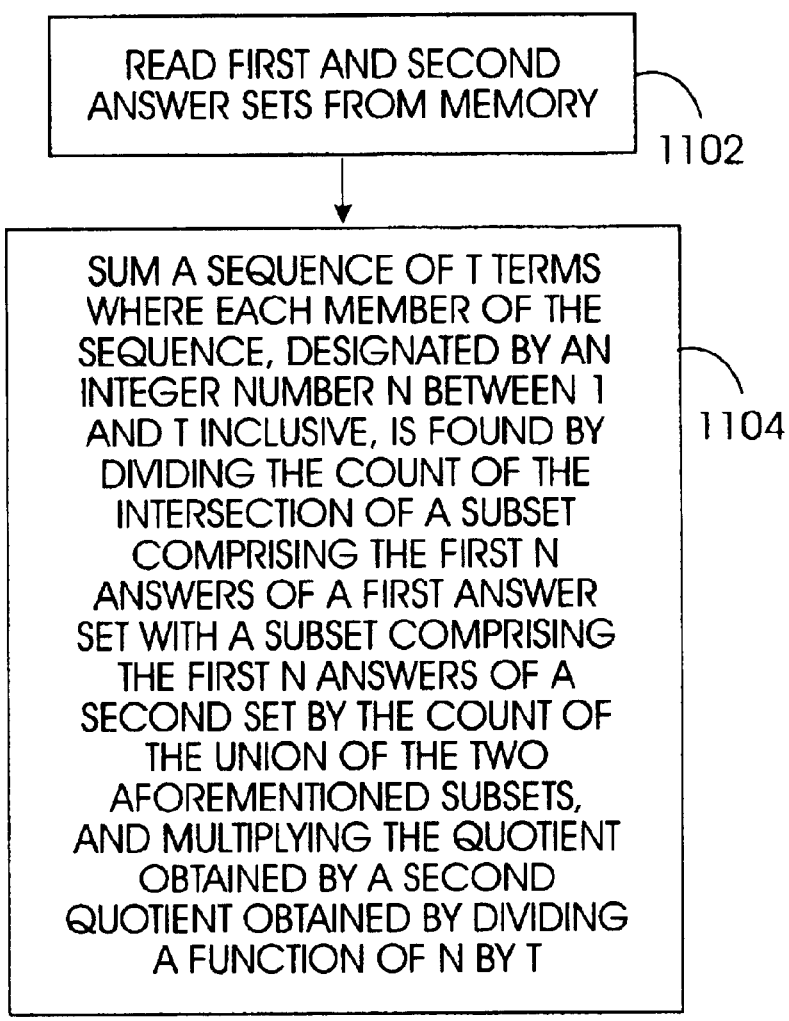
FIG. 11 is a flow diagram of a variation of the method depicted in FIG. 10 in which the weight of different parts of the answer sets can be controlled.

Exemplary Method to Compute the Similarity of Two Ordered Answer Sets with Controlled Emphasis on Different Parts of the Sequences Whereas the preceding measure of similarity inherently gives greater weight to the leading answers in the answer set, the following measure gives some degree of control to the implementer over the weight given to different parts of the answer set. Referring to FIG. 11, in the first process block 1102 first and second answer sets or subsets thereof are read from memory. In a second process block 1104 a sum is taken of a sequence of T terms where each member of the sequence, designated by an integer number N between unity and T inclusive, is found by dividing the count of the intersection of a subset comprising the first N answers of a first answer set with a subset comprising the first N answers of a second set by the count of union of the two aforementioned subsets, and multiplying the quotient obtained by a second quotient obtained by dividing a function of N by T The measure of similarity derived is expressed mathematically the following expression:

$$\frac{1}{T} \times \sum_{N=1}^{T} f(N) \frac{|A_N \cap B_N|}{|A_N \cup B_N|}$$

Where the symbols in common with the preceding equation have the same meaning, and f(N) is a function of N which controls the emphasis the measure of similarity places on different parts on the answer set. The function f(N) may be defined by a mathematical expression or an array of numerical values. For example f(N) could be 1/N, which would tend to increase the weight of the on the first part of the answer sets in the similarity measure. This may be desirable for non-specialized data bases, where many hits following the first few are irrelevant and giving them two much weight would tend degrade the accuracy of the measure. On the other hand for specialized databases, or databases which are searched using strict boolean query statements, it may be desirable to set of f(N) to some monotonic increasing function of N, e.g., N^(1/4), in order for all of the answers considered more equally. The leading (1/T) normalizing factor although not essential for obtaining a good relative measure of similarity, renders the expression more palatable to mathematical sensibilities.

Exemplary Use for Surveying Users Interests

In the embodiments discussed above the search queries of two users were compared. Computation of similarity measures as discussed above could also be used to provide system administrators with a method to survey the interests of the user community. This could be done by comparing users queries to a set of queries conducted by a system administrator and recording information related to user's queries that meet the threshold similarity criterion with respect to the administrators queries, e.g., maintaining a count for each system administrator query of the number of users queries that meet the threshold similarity criterion.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

What is claimed is:

1. A method in a computer network for identifying users with similar interests comprising steps of:

accepting a first query statement from a first user;

storing a first item of information related to the first query;

accepting a second query for a second user;

storing a second item of information related to the second query;

computing a measure of similarity of the first query and the second query by using the first item of information and the second item of information, wherein the measure of similarity is computed by:

generating a list of answers in a union of the first item of information and the second item of information;

generating a set of score difference terms for each answer in the list; and forming a sum by summing the set of score difference terms;

comparing the measure of similarity to a threshold similarity criterion;

in the case that the measure of similarity meets the threshold similarity criterion, informing the first user of the second user;

accepting a request from the first user to invite the second user to participate in a chat session;

forwarding the request to the second user;

accepting an agreement from the second user to chat; and establishing a chat session between the first user and the second user.

2. The method according to claim 1 wherein:

the step of storing a first item of information comprises storing an answer set based on the first query; and the step of storing a second item of information comprises storing an answer set based on the second query.

3. The method according to claim 1 further comprising steps of:

storing a third item of information selected from a group consisting of the first item of information, the second item of information, and a fourth item of information which is related to one or both of the first query and second query;

creating a record of the chat session, referencing the third item of information;

accepting a third query from a third user;

storing a fifth item of information related to the third query;

computing a second measure of similarity between the third item of information and the fifth item of information;

comparing the second measure of similarity to a second threshold similarity criterion; and in the case that the second measure of similarity meets the second threshold similarity criterion, informing the third user of the chat session.

4. The method according to claim 3 wherein:

the step of storing a first item of information comprises storing an answer set based on the first query; and the step of storing a second item of information comprises storing an answer set based on the second query; and the step of storing a fifth item of information comprises storing an answer set based on the third query.

5. The method according to claim 3 further comprising steps of;

accepting a request from the third user to join the chat session; and placing the third user into the chat session.

6. The method according to claim 3 further comprising a step of:

accepting a user ID from the first user;

accepting a user ID from the second user; and accepting a user ID from the third user.

7. A method of obtaining a measure of similarity between a first query and a second query comprising steps of:

reading a first set of answers associated with the first query, wherein each answer of the first set of answers is associated with a score;

reading a second set of answers associated with the second query, wherein each answer in the second set of answers is associated with a score;

generating a list of answers in a union of the first set of answers and the second set;

generating a set of score difference terms for each answer in the list; and forming a sum by summing the set of score difference terms.

8. The method according to claim 7 wherein the step of generating a set of score difference terms comprises sub steps of:

subtracting a score associated with each answer in the first set of answers from a score associated with each answer in the second set of answers.

9. The method of claim 8 further comprising a step of:

subtracting the sum from a constant.

10. The method of claim 8 further comprising a step of:

subtracting the sum from unity.

11. A method for computing a measure of similarity of a first answer set associated with a first query to a second answer set associated with a second query comprising steps of:

reading a first set of answers;

reading a second set of answers; providing an index, which takes on a sequence of integer values;

for each value of the index, forming a first subset having the index number of members of the first set of answers, forming a second subset having the index number of members of the second set of answers, obtaining an intersection count by counting a number of members in an intersection set of the first subset and the second subset, obtaining a union count by counting a number of members in an union set of the first subset and the second subset, and dividing the intersection count by the union count; and summing the value calculated for each value of the index.

12. A computer readable medium containing programming instructions for identifying users with similar interests in computer network for comprising programming instructions for:

accepting a first query statement from a first user;

storing a first item of information related to the first query;

accepting a second query for a second user;

storing a second item of information related to the second query;

computing a measure of similarity of the first query and the second query by using the first item of information and the second item of information, wherein the measure of similarity is computed by;

generating a list of answers in a union of the first item of information and the second item of information;

generating a set of score difference terms for each answer in the list; and forming a sum by summing the set of score difference terms;

comparing the measure of similarity to a threshold similarity criterion;

in the case that the measure of similarity meets the threshold similarity criterion, informing the first user of the second user;

accepting a request from the first user to invite the second user to participate in a chat session;

forwarding the request to the second user;

accepting an agreement from the second user to chat; and establishing a chat session between the first user and the second user.

13. The computer readable medium according to claim 12 wherein:

the programming instructions for storing a first item of information comprises programming instructions for storing an answer set based on the first query; and the programming instructions for storing a second item of information comprises programming instructions for storing an answer set based on the second query.

14. The computer readable medium according to claim 12 further comprising programming instructions for:

storing a third item of information selected from a group consisting of the first item of information, the second item of information, and a fourth item of information which is related to one or both of the first query and second query;

creating a record of the chat session, referencing the third item of information, accepting a third query from a third user;

storing a fifth item of information related to the third query;

computing a second measure of similarity between the third item of information and the fifth item of information;

comparing the second measure of similarity to a second threshold similarity criterion; and in the case that the second measure of similarity meets the second threshold similarity criterion, informing the third user of the chat session.

15. The computer readable medium according to claim 14 wherein:

the programming instructions for storing a first item of information comprises programming instructions for storing an answer set based on the first query; and the programming instructions for storing a second item of information comprises programming instructions for storing an answer set based on the second query; and the programming instructions for storing a fifth item of information comprises programming instructions for storing an answer set based on the third query.

16. The computer readable medium according to claim 14 further comprising programming instructions for:

accepting a request from the third user to join the chat session; and placing the third user into the chat session.

17. The computer readable medium according to claim 14 further comprising programming instructions for:

accepting a user ID from the first user;

accepting a user ID from the second user; and accepting a user ID from the third user.

* * * * *